(12) United States Patent
Kondo et al.

(10) Patent No.: US 10,362,280 B2
(45) Date of Patent: Jul. 23, 2019

(54) IMAGE PROCESSING APPARATUS, IMAGE PROCESSING METHOD, AND IMAGE PICKUP ELEMENT FOR SEPARATING OR EXTRACTING REFLECTION COMPONENT

(71) Applicant: SONY CORPORATION, Tokyo (JP)

(72) Inventors: Yuhi Kondo, Tokyo (JP); Yasutaka Hirasawa, Tokyo (JP); Ying Lu, Tokyo (JP); Ayaka Nakatani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/540,456

(22) PCT Filed: Dec. 8, 2015

(86) PCT No.: PCT/JP2015/084400
§ 371 (c)(1),
(2) Date: Jun. 28, 2017

(87) PCT Pub. No.: WO2016/136085
PCT Pub. Date: Sep. 1, 2016

(65) Prior Publication Data
US 2018/0013988 A1  Jan. 11, 2018

(30) Foreign Application Priority Data

Feb. 27, 2015 (JP) ................. 2015-038164

(51) Int. Cl.
*H04N 9/07* (2006.01)
*G06T 7/514* (2017.01)
(Continued)

(52) U.S. Cl.
CPC ............... *H04N 9/07* (2013.01); *G01B 11/24* (2013.01); *G02B 5/201* (2013.01); *G02B 5/3025* (2013.01);
(Continued)

(58) Field of Classification Search
CPC .......... H04N 9/07; H04N 9/646; G02B 5/201; G02B 5/3025
See application file for complete search history.

(56) References Cited

U.S. PATENT DOCUMENTS

2009/0279807 A1* 11/2009 Kanamorl ............ G02B 5/3025
382/274
2010/0282945 A1* 11/2010 Yokogawa ........ H01L 27/14621
250/208.1
2013/0270421 A1* 10/2013 Kanamori .............. G02B 23/24
250/208.1

FOREIGN PATENT DOCUMENTS

CN      101558282 A    10/2009
CN      101887900 A    11/2010
(Continued)

OTHER PUBLICATIONS

Higo et al., Realtime Removal of Specular Reflection Component Based on Dichromatic Reflection Model, Sep. 9, 2006, IPSJ SIG Technical Report, 2006-CVIM-155, pp. 211-218 (Year: 2006).*
(Continued)

*Primary Examiner* — Nelson D. Hernández Hernández
(74) *Attorney, Agent, or Firm* — Paratus Law Group, PLLC

(57) ABSTRACT

An imaging unit 20 has a configuration in which an identical polarization pixel block made up of a plurality of pixels with an identical polarization direction is provided for each of a plurality of polarization directions and pixels of respective predetermined colors are provided in the identical polarization pixel block. A correction processing unit 31 performs correction processing such as white balance correction on a polarized image generated by the imaging unit 20. A polarized image processing unit 32 separates or extracts a reflection component using the polarized image after the correction processing. By using a polarized image of the separated or extracted reflection component, for example, it is possible to generate normal line information with high accuracy.

16 Claims, 26 Drawing Sheets

(51) Int. Cl.
    *H04N 9/64*    (2006.01)
    *H04N 9/04*    (2006.01)
    *G02B 5/30*    (2006.01)
    *G02B 5/20*    (2006.01)
    *H04N 5/232*   (2006.01)
    *G01B 11/24*   (2006.01)

(52) U.S. Cl.
    CPC .......... *G06T 7/514* (2017.01); *H04N 5/232* (2013.01); *H04N 9/04* (2013.01); *H04N 9/646* (2013.01)

(56) References Cited

FOREIGN PATENT DOCUMENTS

| EP | 2120007 | A1 | 11/2009 |
|---|---|---|---|
| EP | 2252069 | A2 | 11/2010 |
| JP | 2010-263158 | | 11/2010 |
| WO | WO2008/099589 | A1 | 8/2008 |
| WO | WO2013/031100 | A1 | 3/2013 |

OTHER PUBLICATIONS

Atkinson, et al., Recovery of Surface Orientation From Diffuse Polarization, IEEE Transactions on Image Processing, 2006, pp. 1-12.

Wolff, et al., Constraining Object Features Using a Polarization Reflectance Model, Jul. 1991, IEEE Transactions on Pattern Analysis and Machine Intelligence, vol. 13, No. 7, pp. 635-657.

Higo, et al., Realtime Removal of Specular Reflection Component Based on Dichromatic Reflection Model, Sep. 9, 2006, IPSJ SIG Technical Report, 2006-CVIM-155, pp. 211-218.

Jun. 27, 2018, Chinese Office Action issued for related CN Application No. 201580076551.9.

Aug. 2, 2018, European Search Report issued for related EP Application No. 15883375.6.

* cited by examiner

FIG. 4
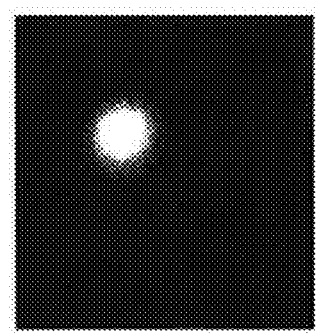
(c)
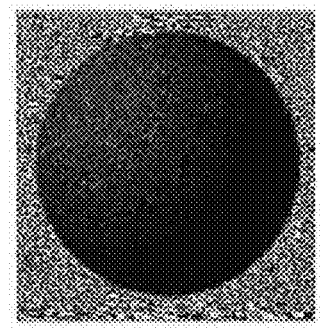
(b)
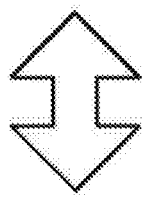
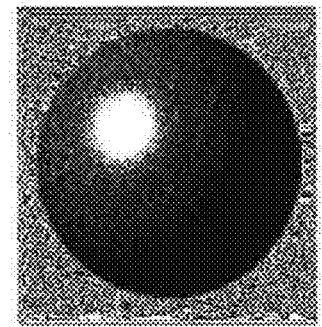
(a)

FIG. 26
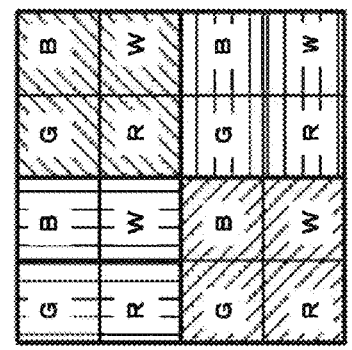
(c)
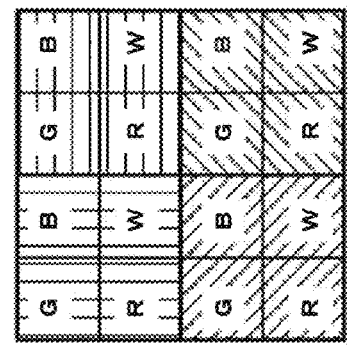
(b)
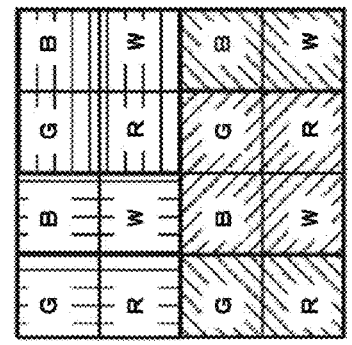
(a)

IMAGE PROCESSING APPARATUS, IMAGE PROCESSING METHOD, AND IMAGE PICKUP ELEMENT FOR SEPARATING OR EXTRACTING REFLECTION COMPONENT

CROSS REFERENCE TO PRIOR APPLICATION

This application is a National Stage Patent Application of PCT International Patent Application No. PCT/JP2015/084400 (filed on Dec. 8, 2015) under 35 U.S.C. § 371, which claims priority to Japanese Patent Application No. 2015-038164 (filed on Feb. 27, 2015), which are all hereby incorporated by reference in their entirety.

TECHNICAL FIELD

This technology relates to an image processing apparatus, an image processing method, and an image pickup element and enables the generation of highly accurate normal line information.

BACKGROUND ART

In the past, a method of generating a polarized image using an imaging unit and a polarizer has been disclosed. For example, Patent Document 1 discloses a method in which a polarizer is disposed in front of an imaging unit to generate a polarized image with a plurality of polarization directions by photographing while this polarizer is rotated. Meanwhile, there is disclosed a method of generating a polarized image with a plurality of polarization directions different from each other by imaging at one time using polarizers with different polarization directions provided for respective pixels.

Additionally, normal line information on an object is generated from a polarized image with a plurality of polarization directions. For example, in Non-patent Document 1 and Non-patent Document 2, normal line information is generated by applying a polarized image with a plurality of polarization directions to a model formula.

CITATION LIST

Patent Document

Patent Document 1: International Publication No. 2008/099589

Non-Patent Document

Non-patent Document 1: Lawrence B. Wolff and Terrance E. Boult: "Constraining Object Features Using a Polarization Reflectance Model", IEEE Transaction on pattern analysis and machine intelligence, Vol. 13, No. 7, July 1991

Non-patent Document 2: Gary A. Atkinson and Edwin R. Hancock: "Recovery of surface orientation from diffuse polarization", IEEE Transactions of Image Processing, Vol. 15, Issue. 6, pp. 1653-1664, 2006

SUMMARY OF THE INVENTION

Problems to be Solved by the Invention

Incidentally, the reflection on an object surface includes specular reflection and diffuse reflection, where the manner of polarization differs between the respective types of reflection. For this reason, the polarized image needs to be processed by taking a reflection component into account.

Therefore, this technology provides an image processing apparatus, an image processing method, and an image pickup element that separate or extract a reflection component.

Solutions to Problems

According to a first aspect of this technology, there is provided an image processing apparatus including a polarized image processing unit that separates or extracts a reflection component using a polarized image generated by an image pickup element having a configuration in which an identical polarization pixel block made up of a plurality of pixels with an identical polarization direction is provided for each of a plurality of polarization directions and pixels of respective predetermined colors are provided in the identical polarization pixel block.

In this technology, the polarized image processing unit separates a reflection component or extracts a diffuse reflection component using a polarized image generated by the image pickup element having a configuration in which the identical polarization pixel block made up of a plurality of pixels with an identical polarization direction is provided for each polarization direction of, for example, three or more directions and pixels of respective predetermined colors are provided in the identical polarization pixel block. In addition, a normal line information generating unit is provided to generate normal line information from a polarized image after separation or extraction of the reflection component. For example, in a case where the reflection component is separated into a diffuse reflection component and a specular reflection component, the normal line information generating unit generates normal line information from each of a polarized image indicating the diffuse reflection component and a polarized image indicating the specular reflection component and then applies weighting thereto by regarding a reflection component having a larger luminance change caused by a difference in polarization angle or a reflection component having less error with respect to a predetermined luminance change caused by a difference in polarization angle as a dominant reflection component, thereby integrating the normal line information. In addition, for example, in a case where the diffuse reflection component is extracted, the normal line information generating unit generates normal line information from a polarized image indicating the diffuse reflection component. Meanwhile, a correction processing unit is provided to adjust a gain of the polarized image for each color such that the reflection component is separated or extracted from the polarized image after the gain adjustment. Furthermore, a non-polarized image generating unit is provided to generate a non-polarized image from the polarized image.

According to a second aspect of this technology, there is provided an image processing method including providing an identical polarization pixel block made up of a plurality of pixels with an identical polarization direction for each of a plurality of polarization directions, and separating or extracting a reflection component in a polarized image processing unit using a polarized image for each predetermined color generated by an image pickup element having a configuration in which pixels of respective colors are provided in the identical polarization pixel block.

According to a third aspect of the technology,
there is provided an image pickup element including:
a polarizer in which an identical polarization pixel block made up of a plurality of pixels with an identical polarization direction is provided for each of a plurality of polarization directions;
a color filter in which pixels of respective predetermined colors are provided in the identical polarization pixel block of the polarizer; and
a sensor unit that generates an image signal on the basis of object light having passed through the polarizer and the color filter.

In this technology, the color filter is configured in such a manner that, for example, a color pattern unit block serving as a pixel block of a predetermined color array is repeatedly provided in a row direction and a column direction of pixels, while the polarizer is configured in such a manner that a polarization pattern unit block serving as a pixel block in which the identical polarization pixel blocks are provided for the plurality of respective polarization directions is repeatedly provided in the row direction and the column direction of pixels. By generating a position difference between the color pattern unit block and the polarization pattern unit block, pixels of respective predetermined colors are provided in the identical polarization pixel block.

In addition, the identical polarization pixel block of the polarizer may be equal in size to the color pattern unit block. Meanwhile, the polarizer may have a configuration in which, for example, the identical polarization pixel blocks whose polarization directions are orthogonal to each other are alternately provided in the column direction or the row direction of pixels, and the color filter may have pixels of respective predetermined colors provided in the identical polarization pixel block. Furthermore, for example, the polarizer is configured in such a manner that the identical polarization pixel blocks having different polarization directions are repeatedly provided in a predetermined order in the row direction (or the column direction) of pixels, and in a subsequent row (or a subsequent column), a difference in block position is generated with respect to a preceding row (or a preceding column) in the row direction (or the column direction) and the identical polarization pixel blocks having polarization directions different from those of the preceding row (or the preceding column) are repeatedly provided in the row direction (or the column direction) in a predetermined order. The color filter may have pixels of respective predetermined colors provided in the identical polarization pixel block. Additionally, the polarizer may have a configuration in which, for example, a non-polarization pixel is provided in the identical polarization pixel block, and the color filter may set a color for the non-polarization pixel such that a color array when the non-polarization pixel is selected becomes a predetermined color array. Furthermore, the color filter may have a configuration in which, for example, pixels of three primary colors and a white pixel are provided in the identical polarization pixel block.

Effects of the Invention

According to this technology, processing of separating or extracting a reflection component is performed on a polarized image generated by an image pickup element having a configuration in which an identical polarization pixel block made up of a plurality of pixels with an identical polarization direction is provided for each of a plurality of polarization directions and pixels of respective predetermined colors are provided in the identical polarization pixel block. Therefore, for example, highly accurate normal line information can be generated by taking the reflection component into account. Note that the effects described in the present specification merely serve as examples and not construed to be limited. There may be an additional effect as well.

BRIEF DESCRIPTION OF DRAWINGS

FIG. 4 is a diagram illustrating a captured image and reflection components.

FIG. 26 is a diagram exemplifying a case where white pixels are provided in the other configurations of the imaging unit.

MODE FOR CARRYING OUT THE INVENTION

Hereinafter, modes for carrying out the present technology will be described. Note that the description will be given in the following order.
1. Basic Configuration of Imaging System
2. First Embodiment of Imaging System
3. Second Embodiment of Imaging System
4. Other Configurations of Imaging Unit
5. Application Example

1. Basic Configuration of Imaging System

Figure 1:
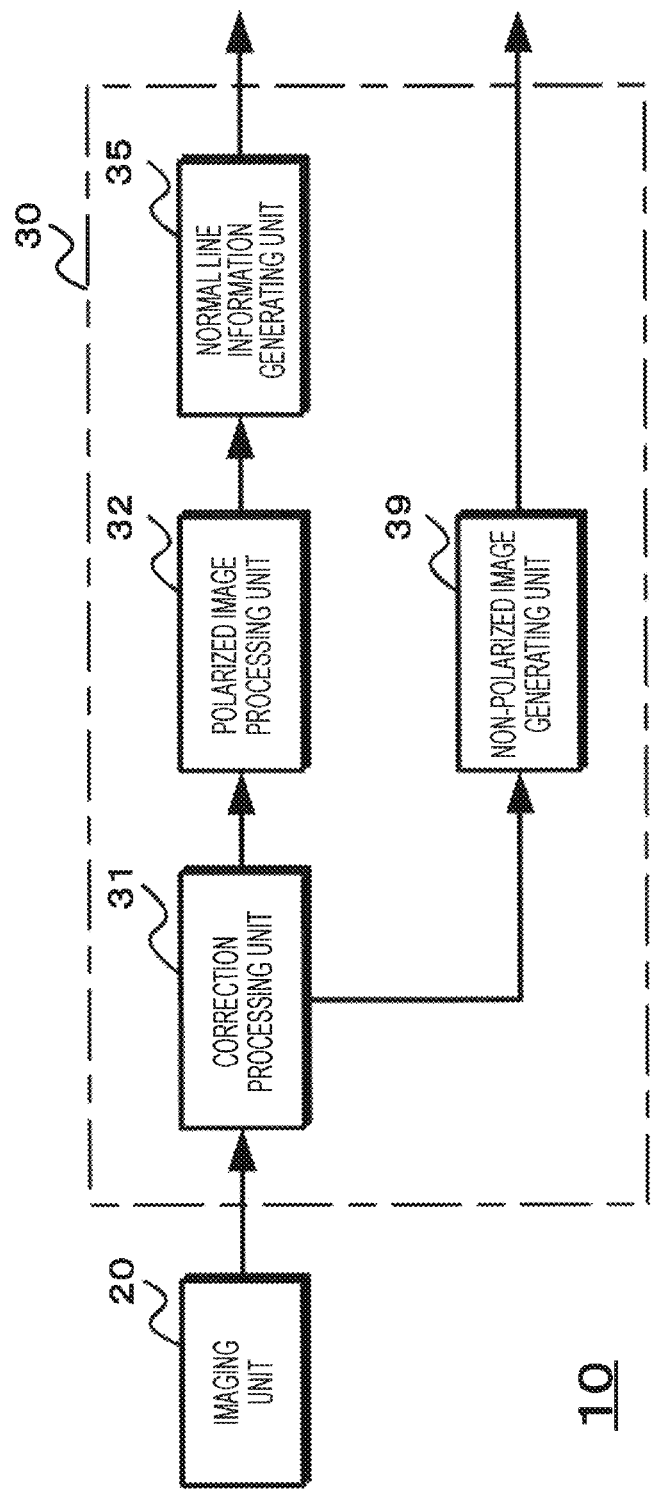
FIG. 1 is a diagram illustrating a basic configuration of an imaging system.

FIG. 1 illustrates a basic configuration of an imaging system using an image processing apparatus of the present technology. The imaging system 10 has an imaging unit 20 and an image processing unit 30. In addition, the image processing unit 30 has, for example, a correction processing unit 31, a polarized image processing unit 32, a normal line information generating unit 35, and a non-polarized image generating unit 39.

The imaging unit 20 generates a polarized image with a plurality of polarization directions using polarized light with a high extinction ratio. The imaging unit 20 is configured using an image pickup element such as a complementary metal oxide semiconductor (CMOS) or a charge coupled device (CCD). The imaging unit 20 is provided with a polarizer and a color filter on an imaging surface of a sensor unit that generates an image signal corresponding to object light by photoelectric conversion. The polarizer has a configuration in which an identical polarization pixel block made up of a plurality of pixels with an identical polarization direction is provided for each of a plurality of polarization directions such that a polarized image with a high extinction ratio can be generated. The color filter has a configuration in which pixels of respective predetermined colors are provided in the identical polarization pixel block of the polarizer. The imaging unit 20 outputs, to the image processing unit 30, an image signal generated by the sensor unit on the basis of object light having passed through the polarizer and the color filter.

Figure 2:
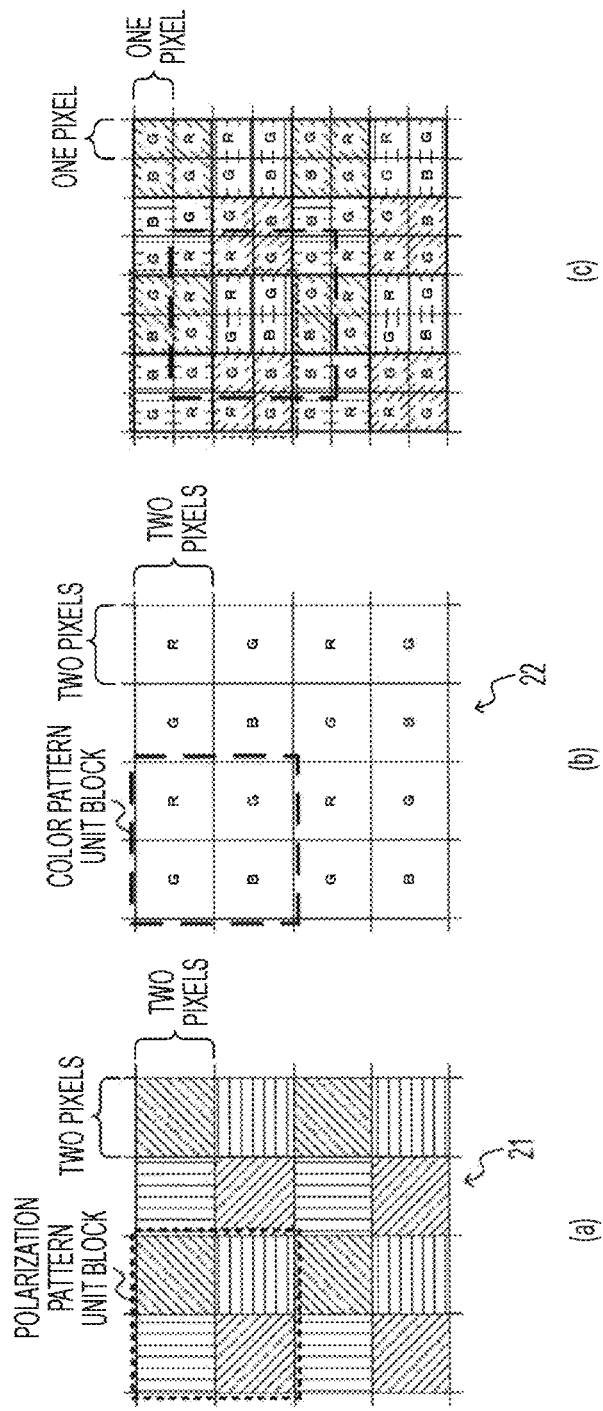
FIG. 2 is a diagram exemplifying a configuration of an imaging unit.

FIG. 2 exemplifies a configuration of the imaging unit. (A) of FIG. 2 exemplifies a configuration of the polarizer of the imaging unit. The polarizer 21 is configured in such a manner that a 2×2 pixel unit having an equal polarization direction is regarded as the identical polarization pixel block and polarization pattern unit blocks of 4×4 pixels each constituted by four identical polarization pixel blocks whose polarization directions are different from each other are repeatedly provided in a row direction and a column direction of pixels. Note that, in (A) of FIG. 2 and FIGS. 21 to 26 described later, the polarization directions are depicted as hatched line directions. In addition, FIG. 2, FIG. 10, FIG. 14, and FIG. 21 exemplify a portion of a pixel region in the imaging unit.

(B) of FIG. 2 exemplifies a configuration of the color filter of the imaging unit. For example, the color filter 22 regards each of a red pixel R, a green pixel G, and a blue pixel B as a 2×2 pixel unit. In addition, as illustrated in (B) of FIG. 2, the color filter 22 has a color pattern unit block made up of one red pixel R, one blue pixel B, and two green pixels G, which is repeatedly provided in the row direction and the column direction of pixels to form a color array as a Bayer array.

As illustrated in (C) of FIG. 2, the imaging unit 20 is provided with the polarizer and the color filter in such a manner that the color pattern unit block generates a position difference of one pixel in both of a horizontal direction and a vertical direction with respective to the polarization pattern unit block. When the polarizer and the color filter are provided in this manner, one red pixel R, one blue pixel B, and two green pixels G are included in one identical polarization pixel block. Meanwhile, a pixel block of 2×2 pixels of an identical color includes pixels in four polarization directions. By configuring the imaging unit as described above, it is possible to generate a polarized image with a plurality of polarization directions with a high extinction ratio, as compared with the case of using a polarizer in which the polarization direction is changed in 1×1 pixel units.

The correction processing unit 31 of the image processing unit 30 adjusts a gain of the polarized image generated by the imaging unit 20 for each color such that the polarized image processing unit 32 can perform processing without being affected by differences in illumination light, variations in the image pickup element, and so on. The correction processing unit 31 performs, for example, sensitivity variation correction for the image pickup element, shading correction for a lens, and white balance correction as correction processing.

Sensitivity variations and shading of a lens are individual-specific and differ depending on pixel positions and colors. Therefore, the correction processing unit 31 performs sensor variation correction and shading correction on the basis of formula (1) using a correction value (gain) GM obtained in advance by measurement or the like.

$$BBij=(BAij-BK)\times GM \qquad (1)$$

Note that, in formula (1), "BAij" is a pixel value at a pixel position (i,j), "BK" is a black level value, and "BBij" is a corrected pixel value. In addition, the black level value uses the same value throughout the screen in some cases or uses a different value measured in advance for each pixel in other cases.

The white balance correction is a correction that adjusts such that the color of illumination becomes white. The correction processing unit 31 may use a correction value calculated in a similar manner to an automatic white balance correction mechanism of a conventional imaging apparatus or may use a correction value calculated by a mechanism in which a user designates an illumination condition by him/herself. It is also possible to calculate a correction value from the polarized image generated by the imaging unit 20.

Figure 3:
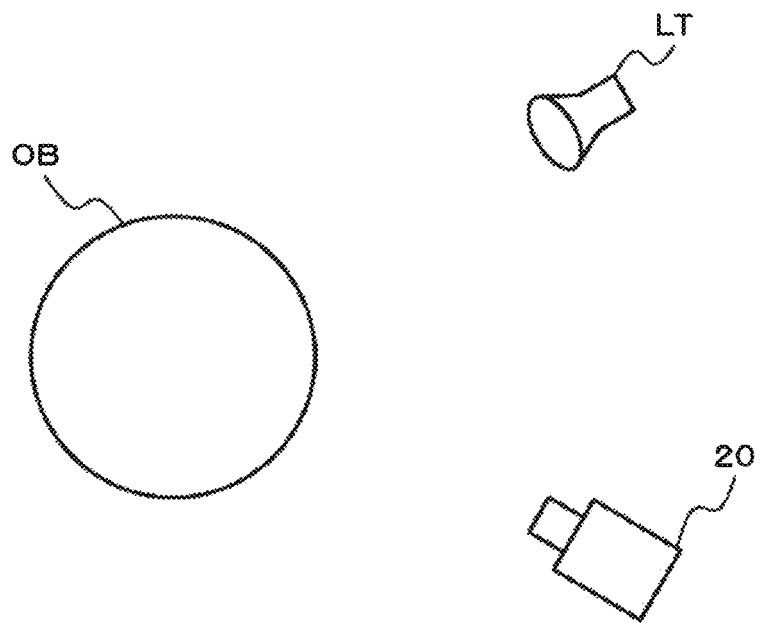
FIG. 3 is a diagram for explaining a generation action for a polarized image.
Figure 5:
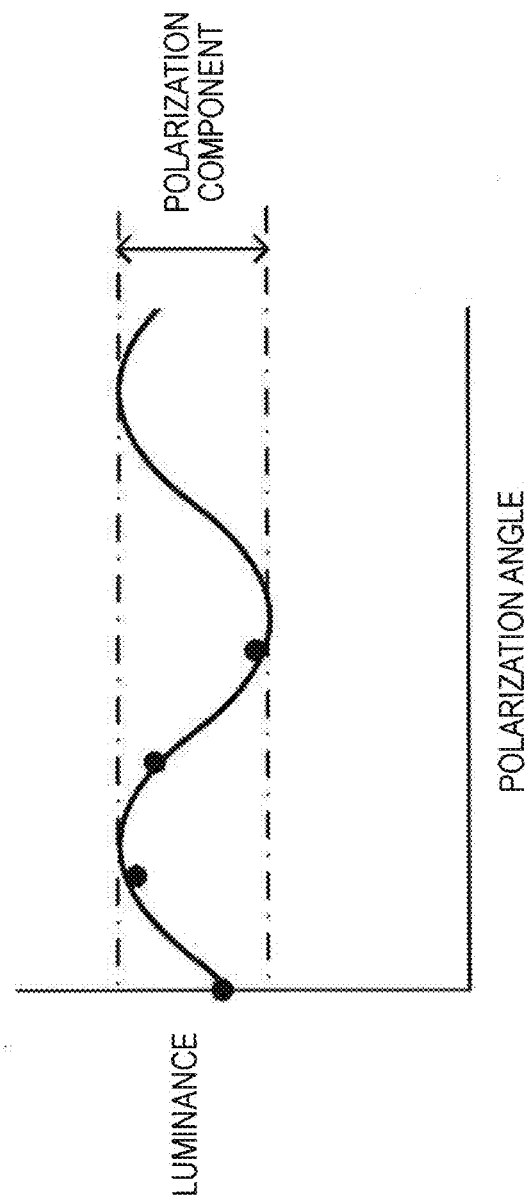
FIG. 5 is a diagram for explaining fitting of luminance values of pixels in four polarization directions.
Figure 8:
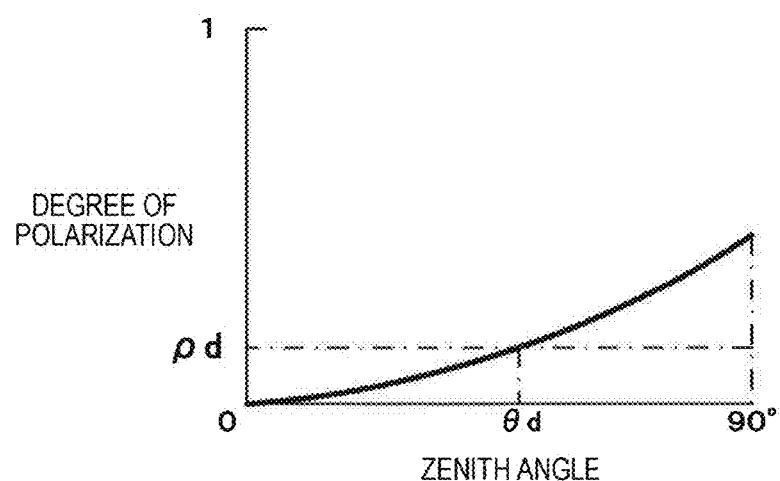
FIG. 8 is a diagram exemplifying a relationship between the degree of polarization and a zenith angle (in the case of diffuse reflection).
Figure 9:
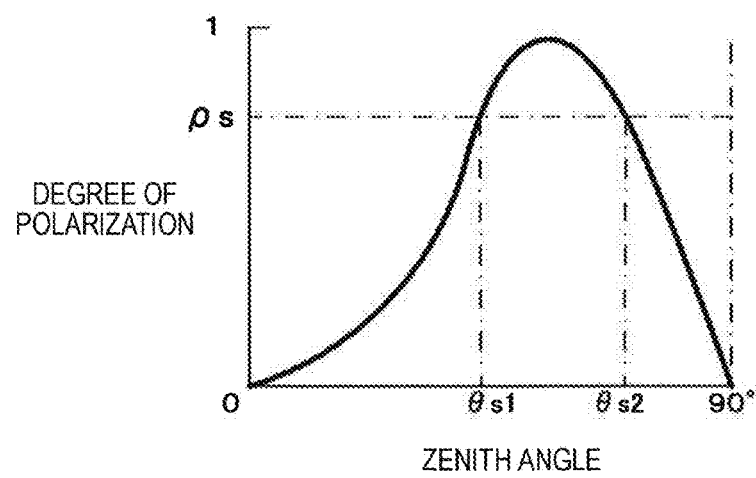
FIG. 9 is a diagram exemplifying a relationship between the degree of polarization and a zenith angle (in the case of specular reflection).

FIG. 3 is a diagram for explaining a generation action for a polarized image. As illustrated in FIG. 3, an object OB is illuminated using a light source LT and the imaging unit 20 images the object OB. FIG. 4 is a diagram illustrating a captured image and reflection components. (A) of FIG. 4 illustrates a captured image generated by the imaging unit and the captured image has a diffuse reflection component illustrated in (B) of FIG. 4 and a specular reflection component illustrated in (C) of FIG. 4. Note that the levels of the diffuse reflection component and the specular reflection component change according to the polarization direction. Specular reflection is often caused by illumination and, as illustrated in FIGS. 8 and 9 to be used in the later description, the specular reflection is easily polarized with a higher degree of polarization than that of diffuse reflection. In addition, in a case where fitting to a polarization model formula (for example, a cos function) indicating a luminance change with respect to a polarization angle is performed using the luminance values of the pixels in the four polarization directions as illustrated in FIG. 5, an amplitude component in the fitted function corresponds to a polarization component. Note that black circles in FIG. 5 indicate the luminance values of the pixels in the four polarization directions. Therefore, the correction processing unit 31 performs processing for each color by considering this polarization component as the specular reflection component and can detect the pixel position of the illumination by simply detecting a pixel position where the luminance of the polarization component is high in all the colors. Accordingly, the correction value is calculated such that this detected pixel position becomes white.

For the correction value of the white balance correction, a correction value (gain) GWred for the red pixel and a correction value (gain) GWblue for the blue pixel are calculated with reference to, for example, the green pixel and then, the pixel values of the red pixel and the blue pixel are corrected on the basis of formulas (2) and (3). Note that, in formula (2), "BDred" indicates the pixel value of the red pixel after correction and "BCred" indicates the pixel value of the red pixel before correction. Meanwhile, in formula (3), "BDblue" indicates the pixel value of the blue pixel after correction and "BCblue" indicates the pixel value of the blue pixel before correction.

$$BDred = BCred \times GWred \quad (2)$$

$$BDblue = BCblue \times GWblue \quad (3)$$

The correction processing unit 31 performs the white balance correction on the polarized image in this manner and outputs the corrected polarized image to the polarized image processing unit 32.

The polarized image processing unit 32 separates or extracts the reflection component from the corrected polarized image and outputs a polarized image of the separated or extracted reflection component to the normal line information generating unit 35.

The normal line information generating unit 35 generates normal line information from the polarized image of the separated or extracted reflection component. The normal line information generating unit 35 obtains the polarization model formula of each of the separated reflection components or the extracted reflection component. Furthermore, the normal line information generating unit 35 obtains an azimuth angle and a zenith angle from the polarization model formula to set as the normal line information.

Figure 6:
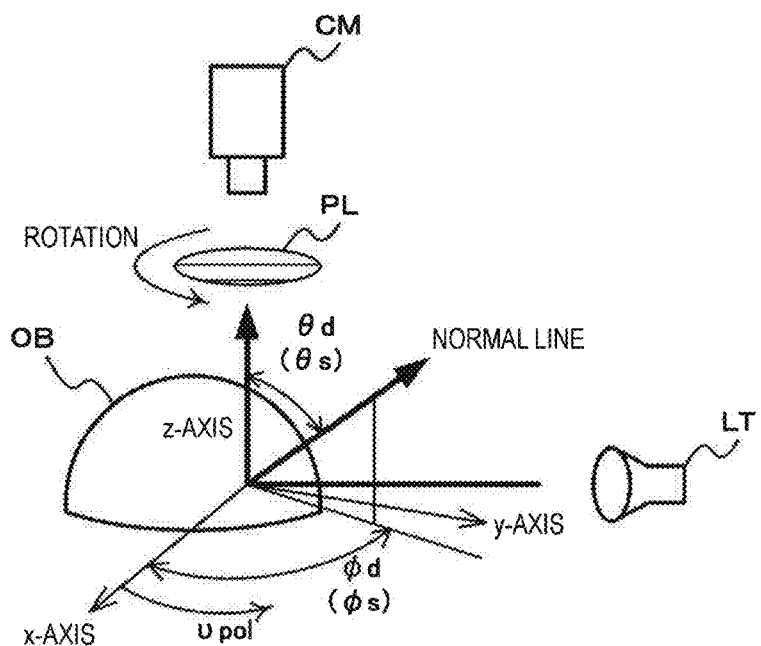
FIG. 6 is a diagram for explaining a luminance change in a polarized image.

FIG. 6 is a diagram for explaining a luminance change in the polarized image. As illustrated in FIG. 6, the object OB is illuminated using the light source LT and an imaging unit CM images the object OB via a polarizing plate PL. In this case, it is known that, in the polarized image generated by the imaging unit CM, the luminance of the object OB changes in accordance with the rotation of the polarizing plate PL. Here, a highest luminance when the polarizing plate PL is rotated is set as Imax and a lowest luminance is set as Imin. In addition, when an x-axis and a y-axis in a two-dimensional coordinates are assumed as a planar direction of the polarizing plate PL, an angle on an xy plane with respect to the x-axis when the polarizing plate PL is rotated is set as a polarization angle $\upsilon pol$. The polarizing plate PL has a cycle of 180 degrees and thus returns to the original polarization state when rotated by 180 degrees.

Figure 7:
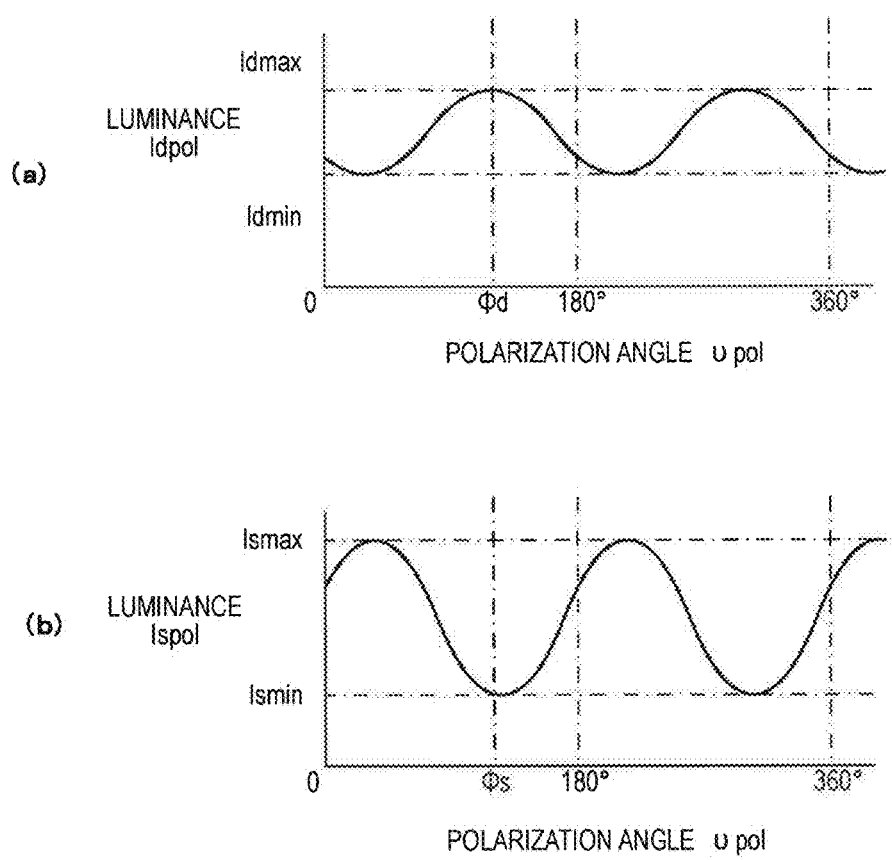
FIG. 7 is a diagram exemplifying relationships between luminance and a polarization angle.

FIG. 7 exemplifies relationships between the luminance and the polarization angle. (A) of FIG. 7 illustrates a relationship between the luminance and the polarization angle in the diffuse reflection, whereas (B) of FIG. 7 illustrates a relationship between the luminance and the polarization angle in the specular reflection.

In the case of the diffuse reflection, the polarization angle $\upsilon pol$ when maximum luminance Idmax is observed is set as an azimuth angle $\phi d$. When such a definition is made, the polarization model formula indicating a change in luminance Idpol observed when the polarizing plate PL is rotated, that is, a predetermined luminance change caused by a difference in polarization angle can be expressed by formula (4).

[Mathematical Formula 1]

$$I_{dpol} = \frac{I_{dmax} + I_{dmin}}{2} + \frac{I_{dmax} - I_{dmin}}{2}\cos2(\upsilon_{pol} - \phi_d) \quad (4)$$

In formula (4), the polarization angle $\upsilon pol$ is obvious at the time of the generation of the polarized image, while the maximum luminance Idmax, minimum luminance Idmin, and the azimuth angle $\phi d$ serve as variables. Therefore, since the number of variables is three, the normal line information generating unit 35 performs fitting to a function illustrated in formula (4) using the luminance of a polarized image representing the diffuse reflection component having three or more polarization directions and determines the azimuth angle $\phi d$ at which the maximum luminance is obtained, on the basis of a function indicating the relationship between the luminance and the polarization angle.

In addition, an object surface normal line is expressed by a polar coordinate system and the normal line information is set as the azimuth angle $\phi d$ and a zenith angle $\theta d$. Note that the zenith angle $\theta d$ is assumed as an angle from a z-axis toward the normal line and the azimuth angle $\phi d$ is assumed as an angle in a y-axis direction with respect to the x-axis as described above. Here, even when the minimum luminance Idmin and the maximum luminance Idmax obtained by rotating the polarizing plate PL are used, the degree of polarization $\rho d$ can be calculated by computing formula (5).

[Mathematical Formula 2]

$$\rho_d = \frac{I_{dmax} - I_{dmin}}{I_{dmax} + I_{dmin}} \quad (5)$$

It is known that a relationship between the degree of polarization and the zenith angle has, for example, a characteristic illustrated in FIG. 8 from the Fresnel equation and it is possible to determine the zenith angle $\theta d$ on the basis of the degree of polarization $\rho d$ from the characteristic illustrated in FIG. 8. Note that the characteristic illustrated in FIG. 8 is an example and the characteristic changes depending on a refractive index of the object.

Meanwhile, in the case of the specular reflection, the polarization angle $\upsilon pol$ when minimum luminance Ismin is observed is set as an azimuth angle $\phi s$. When such a definition is made, the polarization model formula indicating luminance Ispol observed when the polarizing plate PL is rotated, that is, a predetermined luminance change caused by a difference in polarization angle can be expressed by formula (6).

[Mathematical Formula 3]

$$I_{spol} = \frac{I_{smax} + I_{smin}}{2} + \frac{I_{smax} - I_{smin}}{2}\cos2(\upsilon_{pol} - \phi_s + 90) \quad (6)$$

In formula (6), the polarization angle $\upsilon pol$ is obvious at the time of the generation of the polarized image, while maximum luminance Ismax, the minimum luminance Ismin, and the azimuth angle φs serve as variables. Therefore, since the number of variables is three, the normal line information generating unit 35 performs fitting to a function illustrated in formula (6) using the luminance of a polarized image representing the specular reflection component having three or more polarization directions and determines the azimuth angle φs at which the minimum luminance is obtained, on the basis of a function indicating the relationship between the luminance and the polarization angle.

In addition, an object surface normal line is expressed by a polar coordinate system and the normal line information is set as the azimuth angle φs and a zenith angle θs. Note that the zenith angle θs is assumed as an angle from the z-axis toward the normal line and the azimuth angle φs is assumed as an angle in the y-axis direction with respect to the x-axis as described above. Here, even when the minimum luminance Ismin and the maximum luminance Ismax obtained by rotating the polarizing plate PL are used, the degree of polarization ρs can be calculated by computing formula (7).

[Mathematical Formula 4]

$$\rho_s = \frac{I_{smax} - I_{smin}}{I_{smax} + I_{smin}} \quad (7)$$

It is known that a relationship between the degree of polarization and the zenith angle has a characteristic illustrated in FIG. 9 and it is possible to determine one or two zenith angles on the basis of the degree of polarization ρs from the characteristic illustrated in FIG. 9. Note that the characteristic illustrated in FIG. 9 is an example and the characteristic changes depending on a refractive index of the object. In addition, FIG. 9 exemplifies a case where two zenith angles θs1 and θs2 are determined. Note that processing in a case where two zenith angles are determined will be described in a second embodiment of the imaging system described later.

Therefore, the normal line information generating unit 35 obtains the relationship between the luminance and the polarization angle from the polarization direction and the luminance of the polarized image on the basis of the polarized image of each reflection component having three or more polarization directions, to determine the azimuth angles φd and φs. Furthermore, the normal line information generating unit 35 calculates the degree of polarization using the maximum luminance and the minimum luminance obtained from the relationship between the luminance and the polarization angle and then determines the zenith angles θd and θs corresponding to the calculated degree of polarization on the basis of a characteristic curve indicating the relationship between the degree of polarization and the zenith angle. In this manner, the normal line information generating unit 35 obtains the normal line information (the azimuth angle and the zenith angle) of the object for each pixel position on the basis of the polarized image having three or more polarization directions to generate the normal line information.

In addition, since the normal line information generating unit 35 generates the normal line information from the polarized image having three or more polarization directions, the polarizer of the imaging unit has a configuration including the identical polarization pixel blocks having at least three polarization directions different from each other within the polarization pattern unit block.

Figure 10:
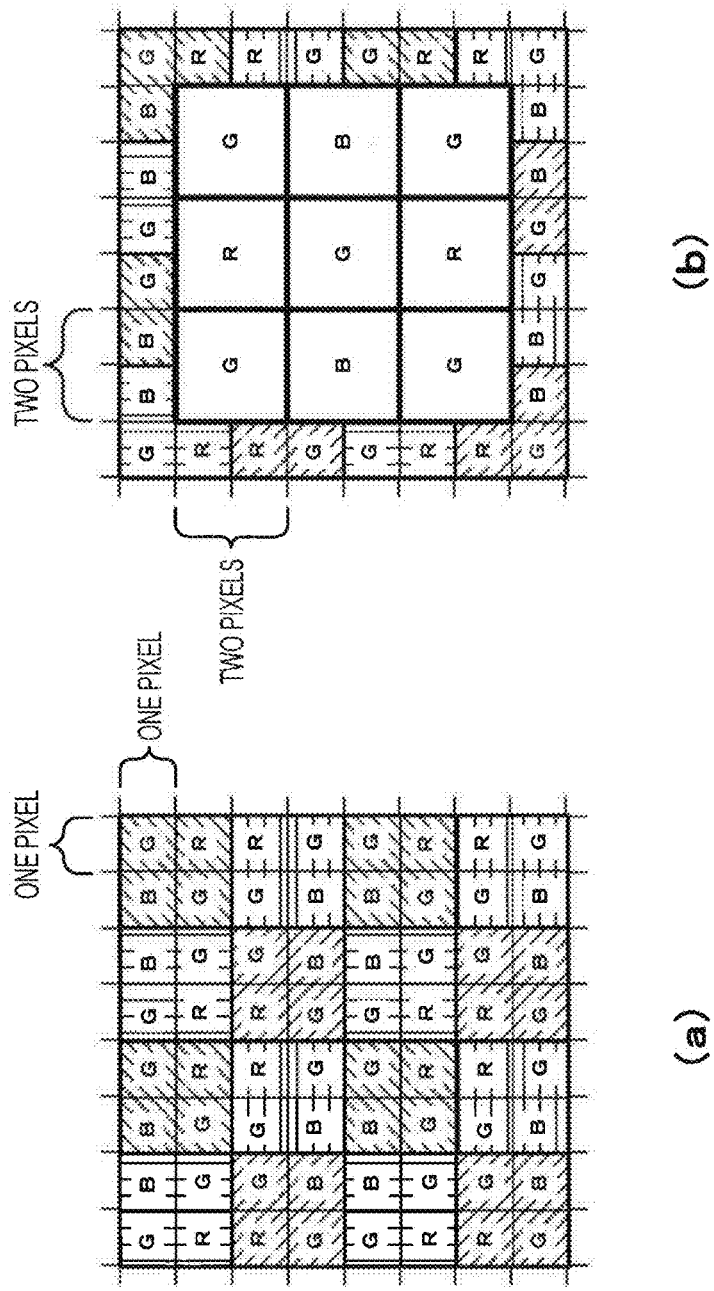
FIG. 10 is a diagram for explaining an action of a non-polarized image generating unit.

The imaging system 10 is provided with the non-polarized image generating unit 39 in a case where an image corresponding to the normal line information is output. The non-polarized image generating unit 39 generates a non-polarized image corresponding to a case where no polarizer is provided, from the polarized image on which the correction processing has been performed by the correction processing unit 31 of the image processing unit 30. FIG. 10 is a diagram for explaining an action of the non-polarized image generating unit. In a case where the imaging unit 20 is configured, for example, as illustrated in (A) of FIG. 10 (similar to FIG. 2), the non-polarized image generating unit 39 has polarization pixels in four polarization directions different from each other included within a block of 2×2 pixel size having an identical color. Therefore, as illustrated in (B) of FIG. 10, the non-polarized image generating unit 39 calculates an average value of the pixel values for each block of 2×2 pixel size having an identical color to set as a pixel value of the non-polarized image. By performing such processing, it is possible to generate a non-polarized image in which the number of pixels in the horizontal direction and the number of pixels in the vertical direction are each made substantially (½) times and the color array is a Bayer array.

Figure 11:
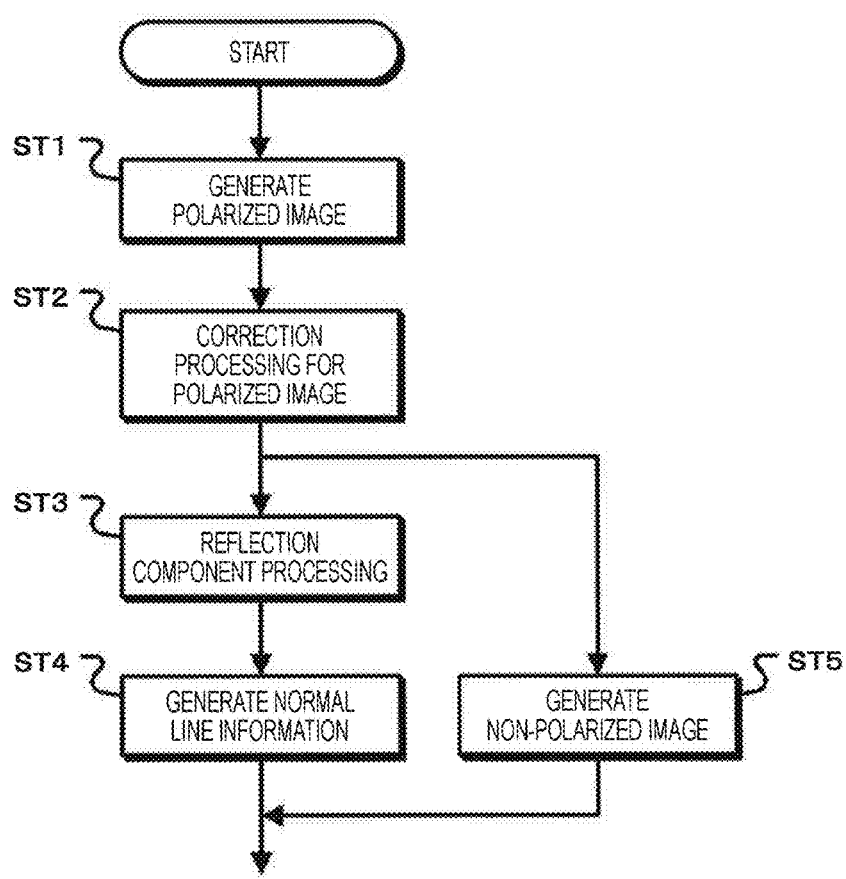
FIG. 11 is a flowchart illustrating a basic action of the imaging system.

FIG. 11 is a flowchart illustrating a basic action of the imaging system. In step ST1, the imaging system 10 generates a polarized image. The imaging unit 20 of the imaging system 10 generates a polarized image with a plurality of polarization directions using polarized light with a high extinction ratio and then proceeds to step ST2.

In step ST2, the imaging system 10 performs the correction processing on the polarized image. The correction processing unit 31 of the imaging system 10 adjusts a gain of the polarized image for each color such that the polarized image can be processed without being affected by differences in illumination light, variations in characteristics of the image pickup element, and so on.

Figure 12:
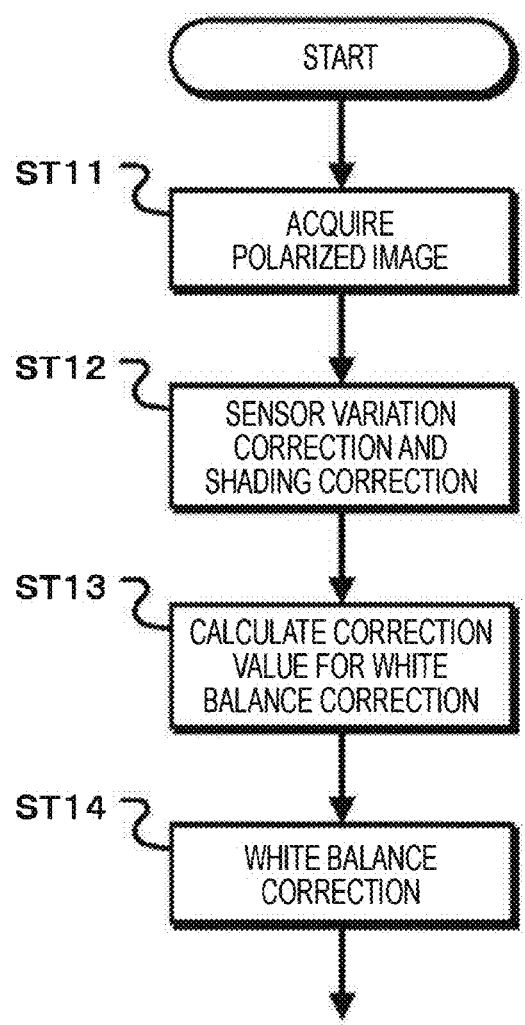
FIG. 12 is a flowchart illustrating correction processing for a polarized image.

FIG. 12 is a flowchart illustrating the correction processing for the polarized image. In step ST11, the correction processing unit 31 acquires the polarized image. The correction processing unit 31 acquires the polarized image generated by the imaging unit 20 and then proceeds to step ST12.

In step ST12, the correction processing unit 31 performs the sensor variation correction and the shading correction. The correction processing unit 31 performs the sensor variation correction and the shading correction using a correction value (gain) obtained in advance by measurement or the like and then proceeds to step ST13.

In step ST13, the correction processing unit 31 calculates a correction value for the white balance correction. The correction processing unit 31 calculates a correction value (gain) for the white balance correction on the basis of a mechanism of automatic white balance correction performed by a conventional imaging apparatus, a mechanism for the user to designate the illumination condition by him/herself, or the specular reflection component and then proceeds to step ST14.

In step ST14, the correction processing unit 31 performs the white balance correction. The correction processing unit 31 performs the white balance correction on the polarized image using the correction value calculated in step ST13 and then proceeds to step ST3 in FIG. 11.

In step ST3, the imaging system 10 performs reflection component processing on the polarized image. The polarized image processing unit 32 of the imaging system 10 performs processing of separating or extracting the reflection component from the polarized image on which the correction processing has been performed in step ST2 and then proceeds to step ST4.

In step ST4, the imaging system 10 generates the normal line information. The normal line information generating unit 35 of the imaging system 10 generates the normal line information from the polarized image of the separated or extracted reflection component.

In step ST5, the imaging system 10 generates an output image. The non-polarized image generating unit 39 of the imaging system 10 generates a non-polarized image corresponding to a case where no polarizer is provided, from the polarized image on which the correction processing has been performed in step ST2.

As described above, since the imaging unit can simultaneously generate the polarized image with a plurality of polarization directions, degradation of temporal resolution of the polarized image can be prevented. For this reason, it is possible to easily acquire a polarization characteristic of, for example, an object that is moving. In addition, since the imaging unit is configured in such a manner that a plurality of pixels having an identical polarization direction is set as the identical polarization pixel block and pixels of respective colors are included in the identical polarization pixel block, the polarized image can be generated with polarized light with a high extinction ratio. Furthermore, since the normal line information is generated by taking the reflection component into account using the polarized image generated with polarized light with a high extinction ratio, highly accurate normal line information can be generated.

2. First Embodiment of Imaging System

Next, a first embodiment of the imaging system will be described. The first embodiment will describe a case in which the normal line information is generated from a polarized image from which the specular reflection has been removed, to generate normal line information in which the influence of the specular reflection, which can cause a problem in outdoor conditions and so on, is reduced.

Figure 13:
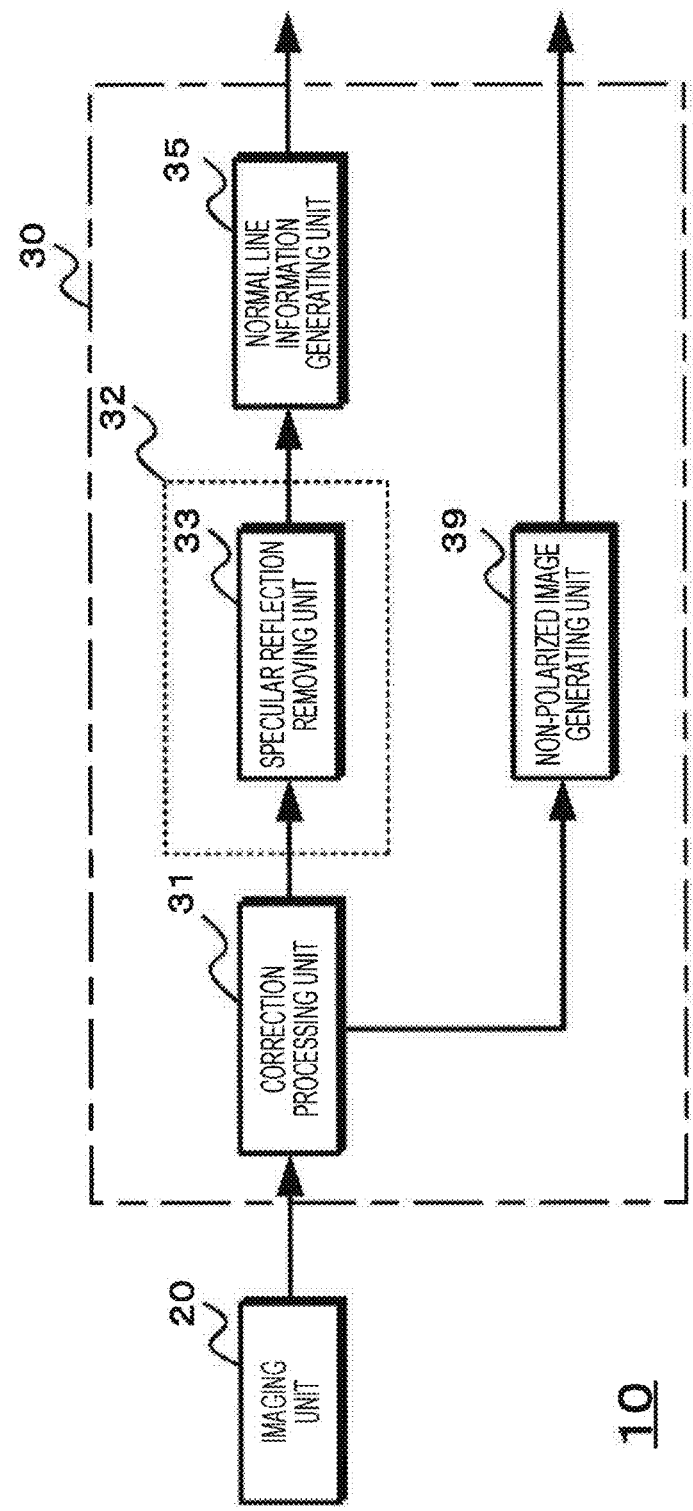
FIG. 13 is a diagram illustrating a configuration of a first embodiment.

FIG. 13 illustrates a configuration of the first embodiment. An imaging system 10 has an imaging unit 20 and an image processing unit 30. In addition, the image processing unit 30 has, for example, a correction processing unit 31, a polarized image processing unit 32, a normal line information generating unit 35, and a non-polarized image generating unit 39, where a specular reflection removing unit 33 is used as the polarized image processing unit 32.

As described above, the imaging unit 20 generates a polarized image with a plurality of polarization directions using polarized light with a high extinction ratio.

The imaging unit 20 is provided with a polarizer and a color filter on an imaging surface of a sensor unit. The polarizer has a configuration in which an identical polarization pixel block made up of a plurality of pixels with an identical polarization direction is provided for each of a plurality of polarization directions such that a polarized image with a high extinction ratio can be generated. The color filter has a configuration in which pixels of respective predetermined colors are provided in the identical polarization pixel block of the polarizer. The imaging unit 20 outputs the generated polarized image to the image processing unit 30.

The correction processing unit 31 of the image processing unit 30 adjusts a gain of the polarized image generated by the imaging unit 20 for each color such that the specular reflection removing unit 33 can perform processing without being affected by differences in illumination light, variations in characteristics of the image pickup element, and so on. The correction processing unit 31 performs, for example, the sensitivity variation correction for the image pickup element, the shading correction for a lens, and the white balance correction as the correction processing and then outputs the corrected polarized image to the specular reflection removing unit 33.

The specular reflection removing unit 33 removes the specular reflection component from the corrected polarized image in order to reduce the influence of the specular reflection. The specular reflection removing unit 33 outputs the polarized image from which the specular reflection component has been removed, that is, the polarized image obtained by extracting the diffuse reflection component, to the normal line information generating unit 35.

Figure 14:
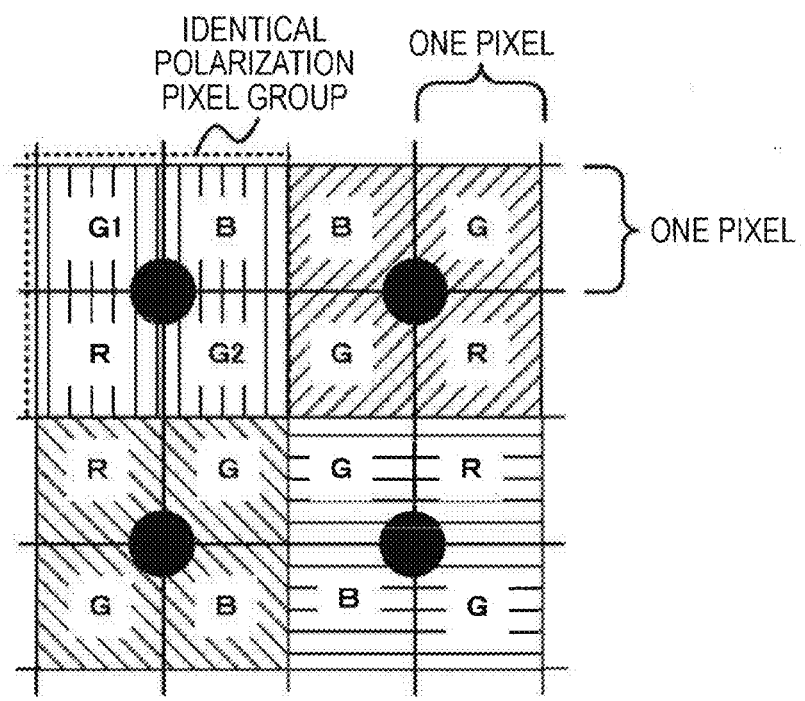
FIG. 14 is a diagram for explaining chrominance calculation.

The specular reflection occurs due to a light source dominant in an imaging scene. Furthermore, since the correction value is adjusted according to the color of the illumination in the correction of the white balance, it is considered that the color of the illumination generating the specular reflection is achromatic. In this case, RGB values representing the color of the illumination have the same value and thus, the specular reflection component can be removed by obtaining chrominance. Accordingly, the specular reflection removing unit 33 obtains chrominance $I'_{\upsilon pol}$ from the polarized image on which the white balance correction and so on have been performed by the correction processing unit 31, for each identical polarization pixel block, that is, each position of black circles as illustrated in FIG. 14, on the basis of formula (8). The specular reflection removing unit 33 performs such processing for each identical polarization pixel block using a pixel value $R_{\upsilon pol}$ of the red pixel, a pixel value $G_{\upsilon pol}$ of the green image, and a pixel value $B_{\upsilon pol}$ of the blue pixel within the block, thereby generating a polarized image having only the diffuse reflection component, namely, an image from which the specular reflection component is removed. Note that, in a case where the color array is configured as the Bayer array as illustrated in FIG. 14, for example, an average value of pixel values $G\upsilon 1$ and $G\upsilon 2$ of the two green pixels is employed as the pixel value $G_{\upsilon pol}$ of the green pixel.

[Mathematical Formula 5]

$$I'_{\upsilon pd} = \sqrt{(R_{\upsilon pol} - G_{\upsilon pol})^2 + (G_{\upsilon pol} - B_{\upsilon pol})^2 + (B_{\upsilon pol} - R_{\upsilon pol})^2} \quad (8)$$

In addition, for example, the specular reflection removing unit 33 generates a polarized image from which the specular reflection component by the light source is removed under the assumption that the light source is white. For removal of the specular reflection component, a technique disclosed in, for example, the document of "D. Miyazaki, R. Tan, K. Hara, and K. Ikeuchi. Polarization-based inverse rendering from a single view. Proceedings of International Conference on Computer Vision, pages 982-987, 2003" may be used. That is, a color space is converted from an RGB space to an M space on the basis of formula (9) and then, an image from which the specular reflection component is removed is generated on the basis of formula (10). By returning the image from which the specular reflection component has been removed to the RGB space from the M space on the basis of formula (11), it is possible to generate a polarized image from which the specular reflection component has been removed.

[Mathematical Formula 6]

$$\begin{pmatrix} m_1 \\ m_2 \\ m_3 \end{pmatrix} = \begin{pmatrix} 1 & -\frac{1}{2} & -\frac{1}{2} \\ 0 & \frac{\sqrt{3}}{2} & -\frac{\sqrt{3}}{2} \\ \frac{1}{3} & \frac{1}{3} & \frac{1}{3} \end{pmatrix} \begin{pmatrix} r \\ g \\ b \end{pmatrix} \quad (9)$$

$$\begin{pmatrix} \hat{m}_1 \\ \hat{m}_2 \\ \hat{m}_3 \end{pmatrix} = \begin{pmatrix} m_1 \\ m_2 \\ a\sqrt{m_1^2 + m_2^2} \end{pmatrix} \quad (10)$$

$$\begin{pmatrix} \hat{r} \\ \hat{g} \\ \hat{b} \end{pmatrix} = \begin{pmatrix} \frac{2}{3} & 0 & 1 \\ -\frac{1}{3} & \frac{1}{\sqrt{3}} & 1 \\ -\frac{1}{3} & -\frac{1}{\sqrt{3}} & 1 \end{pmatrix} \begin{pmatrix} \hat{m}_1 \\ \hat{m}_2 \\ \hat{m}_3 \end{pmatrix} \quad (11)$$

Figure 15:
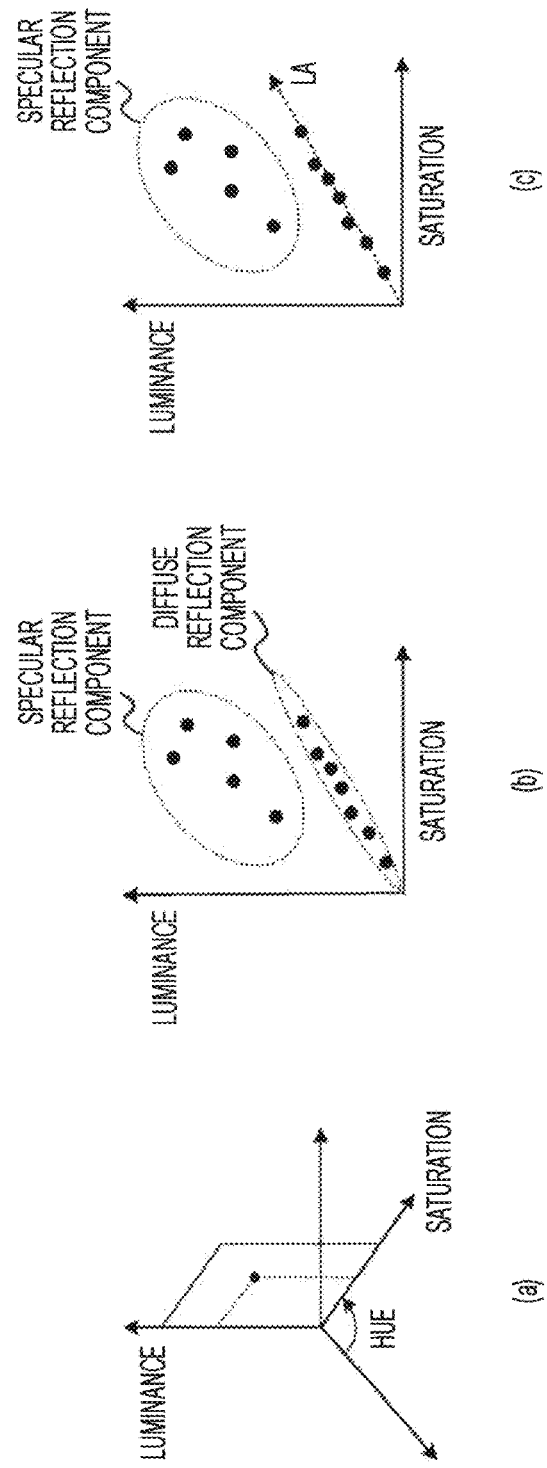
FIG. 15 is a diagram for explaining processing of removing a specular reflection component using an HSV space.

Furthermore, the specular reflection removing unit 33 may remove the specular reflection component using a technique described in, for example, the document of "Image Processing Society Research Report 2006-CVIM-155, 2006/9/9, Realtime Removal of Specular Reflection Component Based on Dichromatic Reflection Model, Tomoaki Higo, Daisuke Miyazaki, Katsushi Ikeuchi". This technique utilizes the fact that the diffuse reflection component has saturation and luminance (intensity) having a proportional relationship in one hue space when projected onto an HSV space. FIG. 15 is a diagram for explaining processing of removing the specular reflection component using the HSV space. The specular reflection removing unit 33 plots the relationship between the saturation and the luminance for each hue as illustrated in (B) of FIG. 15, using the HSV space illustrated in (A) of FIG. 15, which is obtained by converting the RGB space. In addition, as illustrated in (C) of FIG. 15, the specular reflection removing unit 33 removes a component whose luminance is higher than a predetermined amount set in advance with respect to an approximated straight line LA, as the specular reflection component.

The normal line information generating unit 35 generates the normal line information from a polarized image from which the specular reflection component has been removed, that is, a polarized image indicating only the diffuse reflection component. Since the polarized image indicates only the diffuse reflection component, the normal line information generating unit 35 performs fitting to the function illustrated in formula (4) using the luminance of the pixels in the four polarization directions in this polarized image and determines the azimuth angle φd at which the maximum luminance is obtained, on the basis of a function indicating the relationship between the luminance and the polarization angle. Furthermore, the degree of polarization pd is calculated by computing formula (5) and a zenith angle θ is determined on the basis of the degree of polarization pd. The normal line information generating unit 35 sets information indicating the determined azimuth angle φd and zenith angle θd as the normal line information.

Figure 16:
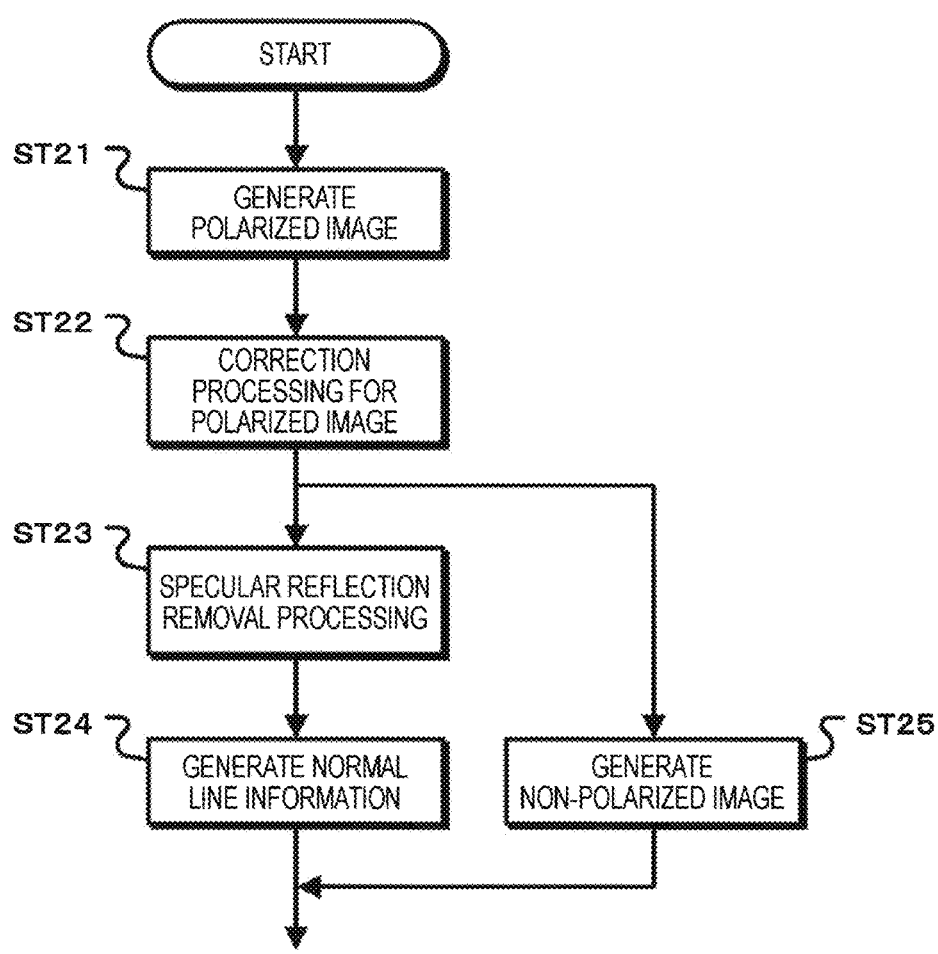
FIG. 16 is a flowchart illustrating an action of the first embodiment.

FIG. 16 is a flowchart illustrating an action of the first embodiment. In step ST21, the imaging system 10 generates a polarized image. As in step ST1 of FIG. 11, the imaging unit 20 of the imaging system 10 generates a polarized image with a plurality of polarization directions using polarized light with a high extinction ratio and then proceeds to step ST22.

In step ST22, the imaging system 10 performs the correction processing on the polarized image. As in step ST2 of FIG. 11, the correction processing unit 31 of the imaging system 10 adjusts a gain of the polarized image for each color such that the polarized image can be processed without being affected by differences in illumination light, variations in characteristics of the image pickup element, and so on and then proceeds to step ST23.

In step ST23, the imaging system 10 performs specular reflection removal processing on the polarized image. The specular reflection removing unit 33 of the imaging system 10 performs processing of removing the specular reflection component from the polarized image on which the correction processing has been performed in step ST22, using the above technique to generate a polarized image of the diffuse reflection component and then proceeds to step ST24.

Figure 17:
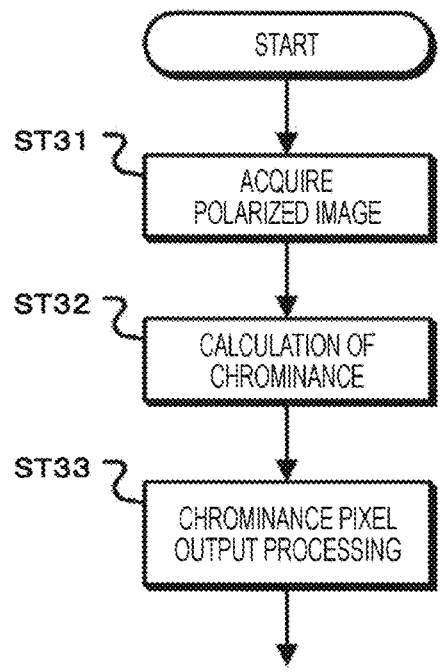
FIG. 17 is a flowchart illustrating specular reflection removal processing.

FIG. 17 is a flowchart illustrating specular reflection removal processing. Note that FIG. 17 illustrates the case of calculating the chrominance for each polarization direction. In step ST31, the specular reflection removing unit 33 acquires the polarized image. The specular reflection removing unit 33 acquires the polarized image on which the correction processing has been performed by the correction processing unit 31 and then proceeds to step ST32.

In step ST32, the specular reflection removing unit 33 calculates the chrominance. The specular reflection removing unit 33 calculates the chrominance using the pixel values of the red pixel, the green pixel G, and the blue pixel B in the identical polarization pixel block having an identical polarization direction and then proceeds to step ST33.

In step ST33, the specular reflection removing unit 33 performs chrominance output processing. As described above, since the chrominance has a value that is not affected by the specular reflection component, the specular reflection removing unit 33 outputs a polarized image indicating the chrominance calculated in step ST32 to the normal line information generating unit 35.

Figure 18:
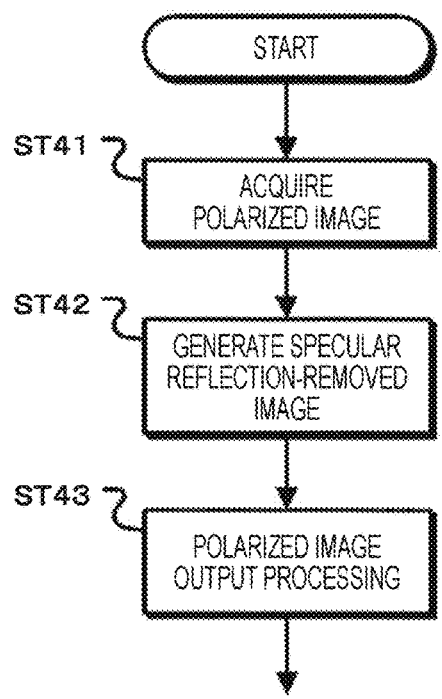
FIG. 18 is a flowchart illustrating another specular reflection removal processing.

FIG. 18 is a flowchart illustrating another specular reflection removal processing. Note that FIG. 18 illustrates the case of generating a polarized image from which the specular reflection component has been removed. In step ST41, the specular reflection removing unit 33 acquires the polarized image. The specular reflection removing unit 33 acquires the polarized image on which the correction processing has been performed by the correction processing unit 31 and then proceeds to step ST42.

In step ST42, the specular reflection removing unit 33 generates a specular reflection-removed image. The specular reflection removing unit 33 generates a polarized image from which the specular reflection component has been removed, using the technique disclosed in the above-mentioned document and then proceeds to step ST43.

In step ST43, the specular reflection removing unit 33 performs polarized image output processing. The specular reflection removing unit 33 outputs the polarized image generated in step ST42, that is, the polarized image of the diffuse reflection component to the normal line information generating unit 35.

In step ST24 of FIG. 16, the imaging system 10 generates the normal line information. The normal line information generating unit 35 of the imaging system 10 generates the normal line information from a polarized image indicating the diffuse reflection component.

In step ST25, the imaging system 10 generates an output image. The non-polarized image generating unit 39 of the imaging system 10 generates a non-polarized image corresponding to a case where no polarizer is provided, from the polarized image on which the correction processing has been performed in step ST22.

As described above, in the first embodiment, the specular reflection component can be removed from the polarized image. In addition, the normal line information is generated from a polarized image indicating the diffuse reflection component, which is obtained by removing the specular reflection component from the polarized image. Therefore, although the specular reflection and the diffuse reflection occur on an object surface, it is possible to remove the influence of specular reflection and generate the normal line information with high accuracy. Furthermore, as in the case of the basic configuration described above, degradation of the temporal resolution of the polarized image can be prevented. In addition, the polarized image can be generated using polarized light with a high extinction ratio and the normal line information can be generated from this polarized image.

3. Second Embodiment of Imaging System

Next, the second embodiment of the imaging system will be described. The second embodiment will describe a case in which the specular reflection component and the diffuse reflection component are separated and the normal line information generated for each reflection component after separation is integrated.

Figure 19:
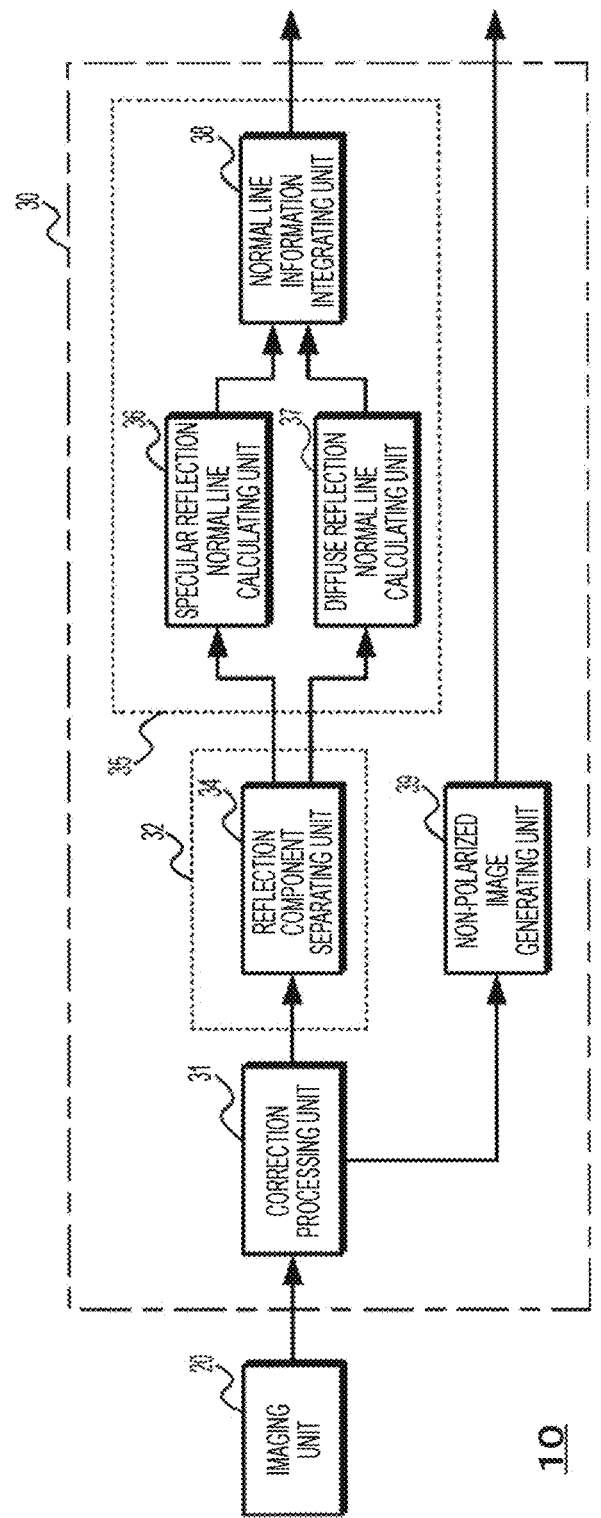
FIG. 19 illustrates a configuration of a second embodiment.

FIG. 19 illustrates a configuration of the second embodiment. The imaging system 10 has an imaging unit 20 and an image processing unit 30. The image processing unit 30 has, for example, a correction processing unit 31, a polarized image processing unit 32, a normal line information generating unit 35, and a non-polarized image generating unit 39. In addition, the image processing unit 30 uses a reflection component separating unit 34 as the polarized image processing unit 32, and a specular reflection normal line information generating unit 36, a diffuse reflection normal line information generating unit 37, and a normal line information integrating unit 38 as the normal line information generating unit 35.

As described above, the imaging unit 20 generates a polarized image with a plurality of polarization directions using polarized light with a high extinction ratio.

The imaging unit 20 is provided with a polarizer and a color filter on an imaging surface of a sensor unit. The polarizer has a configuration in which an identical polarization pixel block made up of a plurality of pixels with an identical polarization direction is provided for each of a plurality of polarization directions such that a polarized image with a high extinction ratio can be generated. The color filter has a configuration in which pixels of respective predetermined colors are provided in the identical polarization pixel block of the polarizer. The imaging unit 20 outputs the generated polarized image to the image processing unit 30.

The correction processing unit 31 of the image processing unit 30 adjusts a gain of the polarized image generated by the imaging unit 20 for each color such that the specular reflection removing unit 33 can perform processing without being affected by differences in illumination light, variations in characteristics of the image pickup element, and so on. The correction processing unit 31 performs, for example, the sensitivity variation correction for the image pickup element, the shading correction for a lens, and the white balance correction as the correction processing and then outputs the corrected polarized image to the reflection component separating unit 34.

The reflection component separating unit 34 separates the specular reflection component and the diffuse reflection component. The reflection component separating unit 34 can separate the specular reflection component using the technique as described above. Therefore, the reflection component separating unit 34 separates the polarized image into a polarized image of the diffuse reflection component and a polarized image of the specular reflection component using a technique similar to that of the specular reflection removing unit 33. The reflection component separating unit 34 outputs the polarized image of the specular reflection component to the specular reflection normal line information generating unit 36 and the polarized image of the diffuse reflection component to the diffuse reflection normal line information generating unit 37.

The specular reflection normal line information generating unit 36 performs fitting to the polarization model formula illustrated in above formula (6) using the luminance of the polarized image of the specular reflection component having three or more polarization directions and determines the azimuth angle $\phi s$ at which the minimum luminance is obtained, on the basis of the fitted function indicating the relationship between the luminance and the polarization angle. The specular reflection normal line information generating unit 36 also calculates the degree of polarization $\rho s$ by computing above formula (7) using the minimum luminance Ismin and the maximum luminance Ismax and determines one or two zenith angles $\theta s$ on the basis of the degree of polarization $\rho s$ from the characteristic illustrated in FIG. 9. The specular reflection normal line information generating unit 36 outputs information indicating the determined azimuth angle $\phi s$ and zenith angle $\theta s$ to the normal line information integrating unit 38 as the normal line information. Note that, as will be described later, in a case where weighting is performed using a luminance change caused by a difference in polarization angle during integration processing by the normal line information integrating unit 38, the specular reflection normal line information generating unit 36 outputs the minimum luminance Ismin and the maximum luminance Ismax to the normal line information integrating unit 38. Meanwhile, in a case where weighting is performed using an error with respect to a predetermined luminance change caused by a difference in polarization angle during the integration processing by the normal line information integrating unit 38, the specular reflection normal line information generating unit 36 outputs a fitting error Es to the normal line information integrating unit 38. The fitting error Es is a difference between a function value and the luminance of the polarized image in a case where fitting to the polarization model formula of formula (6) indicating the predetermined luminance change is performed and, for example, an integrated value or an average value regarding errors between the function values and the luminance for the respective polarization directions is used.

The diffuse reflection normal line information generating unit 37 performs fitting to the polarization model formula illustrated in above formula (4) using the luminance of the polarized image of the diffuse reflection component having three or more polarization directions and determines the azimuth angle $\phi d$ at which the maximum luminance is obtained, on the basis of the fitted function indicating the relationship between the luminance and the polarization angle. The diffuse reflection normal line information generating unit 37 also calculates the degree of polarization ρd by computing above formula (5) using the minimum luminance Idmin and the maximum luminance Idmax and determines the zenith angle θd on the basis of the degree of polarization ρd from the characteristic illustrated in FIG. 8. The diffuse reflection normal line information generating unit 37 outputs information indicating the determined azimuth angle φd and zenith angle θd to the normal line information integrating unit 38 as the normal line information. Note that, as will be described later, in a case where weighting is performed using a luminance change caused by a difference in polarization angle during the integration processing by the normal line information integrating unit 38, the diffuse reflection normal line information generating unit 37 outputs the minimum luminance Idmin and the maximum luminance Idmax to the normal line information integrating unit 38. Meanwhile, in a case where weighting is performed using an error with respect to a predetermined luminance change caused by a difference in polarization angle during the integration processing by the normal line information integrating unit 38, the diffuse reflection normal line information generating unit 37 outputs a fitting error Ed to the normal line information integrating unit 38. The fitting error Ed is a difference between a function value and the luminance of the polarized image in a case where fitting to the function of formula (4) indicating the predetermined luminance change is performed and, for example, an integrated value or an average value of errors between the function values and the luminance for the respective polarization directions is used.

The normal line information integrating unit 38 performs the integration processing for the normal line information generated by the specular reflection normal line information generating unit 36 and the normal line information generated by the diffuse reflection normal line information generating unit 37. For example, the normal line information integrating unit 38 averages the acquired normal line information as the integration processing for the normal line information. Specifically, the integration processing is performed on the basis of formula (12) to generate an azimuth angle φds. In addition, since the zenith angles θs1 and θs2 are sometimes determined by the specular reflection normal line information generating unit 36, the integration processing is performed on the basis of formula (13) or (14) to settle the zenith angle θds.

[Mathematical Formula 7]

$$\phi ds = \frac{(\phi d + \phi s)}{2} \tag{12}$$

In the case of $|\theta d - \theta s1| \le |\theta d - \theta s2|$, (13)

$$\theta ds = \frac{(\theta d + \theta s1)}{2}$$

In the case of $|\theta d - \theta s1| > |\theta d - \theta s2|$, (14)

$$\theta ds = \frac{(\theta d + \theta s2)}{2}$$

Additionally, the normal line information integrating unit 38 may perform weighting according to which of the diffuse reflection and the specular reflection is dominant when performing the integration processing on the normal line information generated by the specular reflection normal line information generating unit 36 and the normal line information generated by the diffuse reflection normal line information generating unit 37. For example, a luminance change caused by a difference in polarization angle may be used for weighting, or an error with respect to a predetermined luminance change caused by a difference in polarization angle may be used therefor.

Next, a description will be given of a case where weighting is performed using a luminance change caused by a difference in polarization angle. The normal line information integrating unit 38 sets a reflection component having a larger luminance change caused by a difference in polarization angle as a dominant reflection component. That is, the normal line information integrating unit 38 integrates the normal line information by calculating the amplitude of the luminance for each reflection component and selecting one with a larger amplitude. Additionally, since two zenith angles are sometimes determined for the specular reflection component, one closer to the zenith angle obtained for the diffuse reflection component is selected. Formula (15) indicates a formula for calculating an amplitude Ad of the diffuse reflection component, whereas formula (16) indicates a formula for calculating an amplitude As of the specular reflection component.

$$Ad = Id \max - Id \min \tag{15}$$

$$As = Is \max - Is \min \tag{16}$$

As illustrated in formula (17), the normal line information integrating unit 38 performs the integration processing by weighting using the amplitude of the diffuse reflection component and the amplitude of the specular reflection component to generate the azimuth angle φds. Meanwhile, as illustrated in formulas (18) and (19), the normal line information integrating unit 38 performs the integration processing by weighting using the amplitude of the diffuse reflection component and the amplitude of the specular reflection component to generate the zenith angle θds.

[Mathematical Formula 8]

$$\phi ds = \frac{Ad}{Ad + As}\phi d + \frac{As}{Ad + As}\phi s \tag{17}$$

In the case of $|\theta d - \theta s1| \le |\theta d - \theta s2|$, (18)

$$\theta ds = \frac{Ad}{As + Ad}\theta d + \frac{As}{As + Ad}\theta s1$$

In the case of $|\theta d - \theta s1| > |\theta d - \theta s2|$, (19)

$$\theta ds = \frac{Ad}{As + Ad}\theta d + \frac{As}{As + Ad}\theta s2$$

Next, a description will be given of a case where weighting is performed using an error with respect to a predetermined luminance change caused by a difference in polarization angle. The normal line information integrating unit 38 integrates the normal line information by selecting one with less fitting error which is an error with respect to a predetermined luminance change. Additionally, since two zenith angles are sometimes determined for the specular reflection component, one closer to the zenith angle obtained for the diffuse reflection component is selected. As illustrated in formula (20), the normal line information integrating unit 38 performs the integration processing by weighting using the fitting error Ed of the diffuse reflection component and the fitting error Es of the specular reflection component to generate the azimuth angle φds. Meanwhile, as illustrated in formulas (21) and (22), the normal line information integrating unit 38 performs the integration processing by weighting using the fitting error Ed of the diffuse reflection component and the fitting error Es of the specular reflection component to generate the zenith angle θds.

[Mathematical Formula 9]

$$\phi ds = \frac{Es}{Ed + Es}\phi d + \frac{Es}{Ed + Es}\phi s \quad (20)$$

In the case of $|\theta d - \theta s1| \le |\theta d - \theta s2|$, (21)

$$\theta ds = \frac{Es}{Es + Ed}\theta d + \frac{Ed}{Es + Ed}\theta s1$$

In the case of $|\theta d - \theta s1| > |\theta d - \theta s2|$, (22)

$$\theta ds = \frac{Ed}{Es + Ed}\theta d + \frac{Es}{Es + Ed}\theta s2$$

In addition, the normal line information integrating unit 38 may select one of the normal line information generated from the polarized image of the diffuse reflection component and the normal line information generated from the polarized image of the specular reflection component as the integration of the normal line information. Here, the normal line information integrating unit 38 selects normal line information of reflection that is dominant from either the diffuse reflection or the specular reflection. For example, the normal line information integrating unit 38 considers that reflection with a larger luminance change caused by a difference in polarization angle is dominant and selects normal line information with a larger amplitude from either the amplitude Ad of the diffuse reflection component or the amplitude As of the specular reflection component. Alternatively, the normal line information integrating unit 38 considers that reflection with less error with respect to a predetermined luminance change caused by a difference in polarization angle is dominant and selects normal line information with less error from either the fitting error Ed of the diffuse reflection component or the fitting error Es of the specular reflection component. Alternatively, the normal line information integrating unit 38 may determine an error relative to surrounding normal line information and select normal line information with less error. Alternatively, the normal line information integrating unit 38 may select the normal information by combining these methods, or may select the normal line information by combining another method as well. Furthermore, in a case where the normal line information of the specular reflection component is selected and the two zenith angles θs1 and θs2 are determined as described above, the normal line information integrating unit 38 selects a zenith angle with a smaller angular difference from the zenith angle θd indicated by the normal, line information of the diffuse reflection component from either the zenith angle θs1 or θs2.

Figure 20:
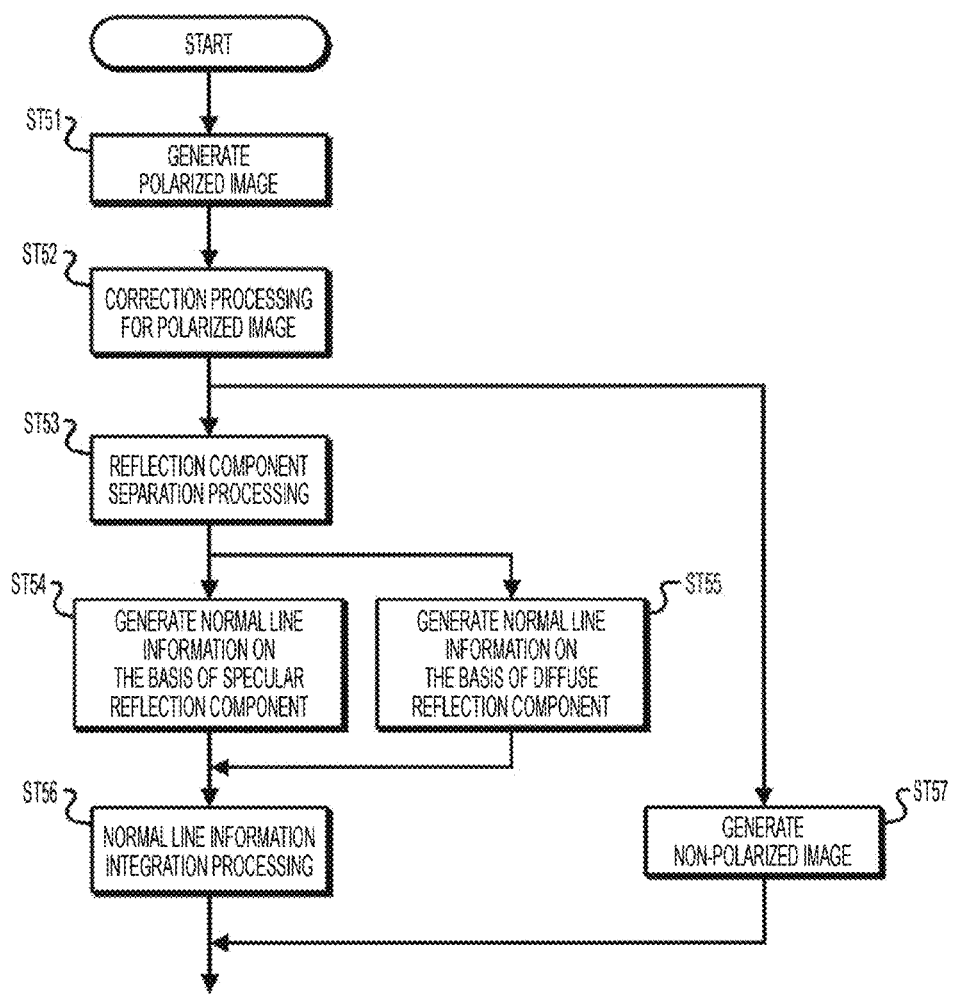
FIG. 20 is a flowchart illustrating an action of the second embodiment.

FIG. 20 is a flowchart illustrating an action of the second embodiment. In step ST51, the imaging system 10 generates a polarized image. As in step ST1 of FIG. 11, the imaging unit 20 of the imaging system 10 generates a polarized image with a plurality of polarization directions using polarized light with a high extinction ratio and then proceeds to step ST52.

In step ST52, the imaging system 10 performs the correction processing on the polarized image. As in step ST2 of FIG. 11, the correction processing unit 31 of the imaging system 10 adjusts a gain of the polarized image for each color such that the polarized image can be processed without being affected by differences in illumination light, variations in characteristics of the image pickup element, and so on and then proceeds to step ST53.

In step ST53, the imaging system 10 performs reflection component separation processing on the polarized image. The reflection component separating unit 34 of the imaging system 10 separates the specular reflection component and the diffuse reflection component from the polarized image on which the correction processing has been performed in step ST52, using the above technique and then proceeds to steps ST54 and ST55.

In step ST54, the imaging system 10 generates the normal line information on the basis of the specular reflection component. The specular reflection normal line information generating unit 36 of the imaging system 10 generates the normal line information from the polarized image of the specular reflection component and then proceeds to step ST56.

In step ST55, the imaging system 10 generates the normal line information on the basis of the diffuse reflection component. The diffuse reflection normal line information generating unit 37 of the imaging system 10 generates the normal line information from the polarized image of the diffuse reflection component and then proceeds to step ST56.

In step ST56, the imaging system 10 performs normal line information integration processing. The normal line information integrating unit 38 of the imaging system 10 integrates the normal line information acquired in step ST54 and the normal line information acquired in step ST55.

In step ST57, the imaging system 10 generates a non-polarized image. The non-polarized image generating unit 39 of the imaging system 10 generates a non-polarized image corresponding to a case where no polarizer is provided, from the polarized image on which the correction processing has been performed in step ST52.

As described above, in the second embodiment, the specular reflection component and the diffuse reflection component can be separated from the polarized image. In addition, the normal line information is generated for each reflection component. Besides, the normal line information generated for each reflection component is integrated. Furthermore, during the integration of the normal line information, the normal line information is integrated in accordance with which of the specular reflection component and the diffuse reflection component is dominant in reflection on the object surface. Therefore, the normal line information can be generated with high accuracy by taking the specular reflection into account. Furthermore, as in the case of the basic configuration described above, degradation of the temporal resolution of the polarized image can be prevented. In addition, the polarized image can be generated using polarized light with a high extinction ratio and the normal line information can be generated from this polarized image.

4. Other Configurations of Imaging Unit

Figure 21:
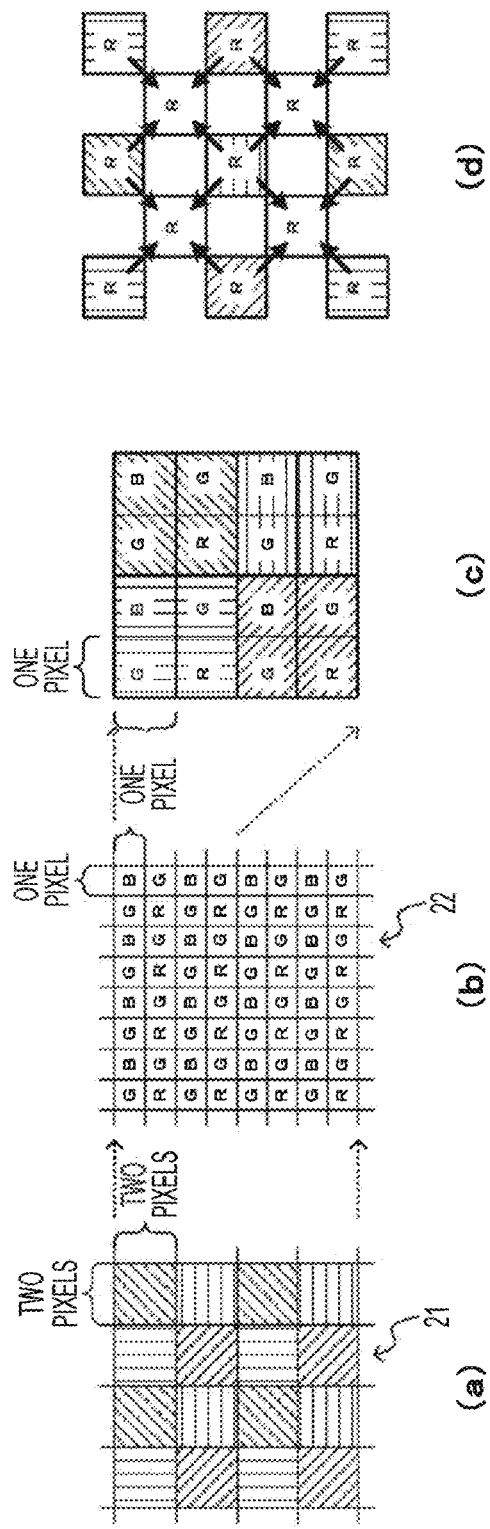
FIG. 21 is a diagram exemplifying another configuration of the imaging unit.

Incidentally, the configuration of the imaging unit is not limited to the configuration illustrated in FIG. 2. FIG. 21 exemplifies other configurations of the imaging unit, where the color filter has the color pattern unit block, which is a unit of a predetermined color array, repeatedly provided in the row direction and the column direction of pixels. In addition, the polarizer sets the identical polarization pixel block to a size equal to the color pattern unit block.

In FIG. 21, the polarizer 21 of the imaging unit sets a 2×2 pixel unit having an equal polarization direction as the identical polarization pixel block, as in (A) of FIG. 21. In addition, the polarizer 21 has a configuration in which a polarization pattern unit block of 4×4 pixels made up of four identical, polarization pixel blocks whose polarization directions are different from each other is repeatedly provided in the row direction and the column direction of pixels.

Meanwhile, as illustrated in (B) of FIG. 21, the color filter 22 sets a 2×2 pixel block made up of one red pixel R, one blue pixel B, and two green pixels G as the color pattern unit block. Additionally, the color filter 22 is configured as a Bayer array in which this color pattern unit block is repeatedly provided in the row direction and the column direction of pixels.

Furthermore, as illustrated in (C) of FIG. 21, the polarizer and the color filter are configured such that the positions of the identical polarization pixel block and the color pattern unit block coincide. Note that, in (C) and (D) of FIG. 21, and (C) and (D) of FIG. 22, (C) and (D) of FIG. 23, and (C) of FIG. 24 described later, pixels are illustrated in an enlarged manner such that the configurations of the pixels are easily recognized.

In the case of configuring the imaging unit in this manner, since the identical polarization pixel block is in units of 2×2 pixels as in the case illustrated in FIG. 2, the polarized image can be generated using polarized light with a high extinction ratio as in the imaging unit illustrated in FIG. 2.

Additionally, in the case of using the imaging unit having this configuration, as illustrated in (D) of FIG. 21, the non-polarized image generating unit calculates, for each predetermined color, a pixel value average of closest four pixels whose polarization directions are different from each other, to set as a pixel value of the non-polarized image for each color. Note that (D) of FIG. 21 exemplifies the case of the red pixel. In this case, in regard to the number of pixels of the non-polarized image, the number of pixels in the horizontal and vertical directions is not made substantially (½) times unlike the case illustrated in (B) of FIG. 10. Besides, since the pixel value average of closest four pixels whose polarization directions are different from each other is sequentially calculated for each color to be set as a pixel value of the non-polarized image, a non-polarized image whose color array is the Bayer array can be easily generated.

Figure 22:
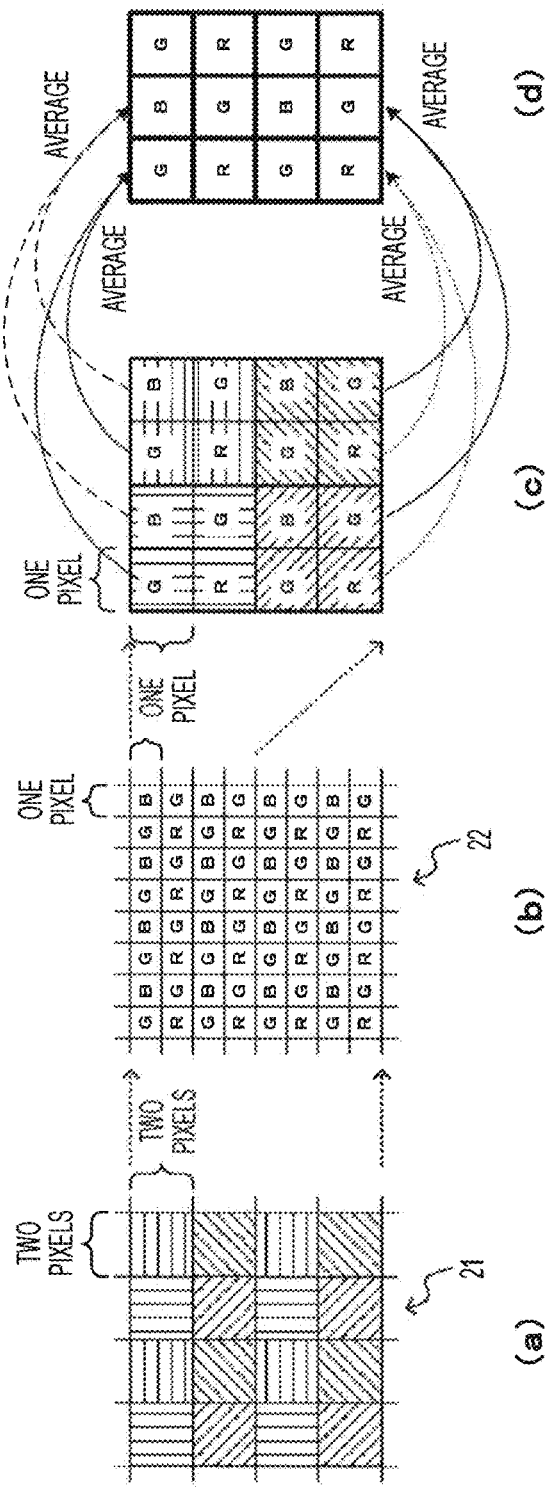
FIG. 22 is a diagram exemplifying another configuration of the imaging unit.

In FIG. 22, the polarizer 21 of the imaging unit sets a 2×2 pixel unit having an equal polarization direction as the identical polarization pixel block, as in (A) of FIG. 22. In addition, in the polarizer 21, a polarization pattern unit block of 4×4 pixels made up of four identical polarization pixel blocks whose polarization directions are different from each other is repeatedly provided in the row direction and the column direction of pixels. Furthermore, the polarizer 21 is configured such that, for example, the polarization directions of the identical polarization pixel blocks adjacent in the horizontal direction have a difference of 90 degrees.

Meanwhile, as illustrated in (B) of FIG. 22, the color filter 22 sets a 2×2 pixel block made up of one red pixel R, one blue pixel B, and two green pixels G as the color pattern unit block. Additionally, the color filter 22 is configured as a Bayer array in which this color pattern unit block is repeatedly provided in the row direction and the column direction of pixels.

Furthermore, as illustrated in (C) of FIG. 22, the polarizer and the color filter are configured such that the positions of the identical polarization pixel block and the color pattern unit block coincide.

In the case of configuring the imaging unit in this manner, as illustrated in (D) of FIG. 22, the non-polarized image generating unit calculates, for each color, an average value of two pixel values having a difference of 90 degrees in the polarization direction and most proximate to each other in the horizontal direction, to set as a pixel value of the non-polarized image. Therefore, the number of pixels of the non-polarized image is not made substantially (½) times in the horizontal and vertical directions unlike the case illustrated in (B) of FIG. 10. Besides, since the average value of two pixel values for each color is used as a non-polarization pixel value, a non-polarized image whose color array is the Bayer array can be easily generated.

Note that, although FIG. 22 exemplify a case where the identical polarization pixel blocks whose polarization directions differ by 90 degrees are provided adjacent to each other in the horizontal direction, a configuration for providing the identical polarization pixel blocks adjacent to each other in the vertical direction may be adopted. In this case, the non-polarized image generating unit 39 sets an average value of two pixel values for each color having a difference of 90 degrees in the polarization direction and most proximate to each other in the vertical direction as a pixel value of the non-polarized image.

Figure 23:
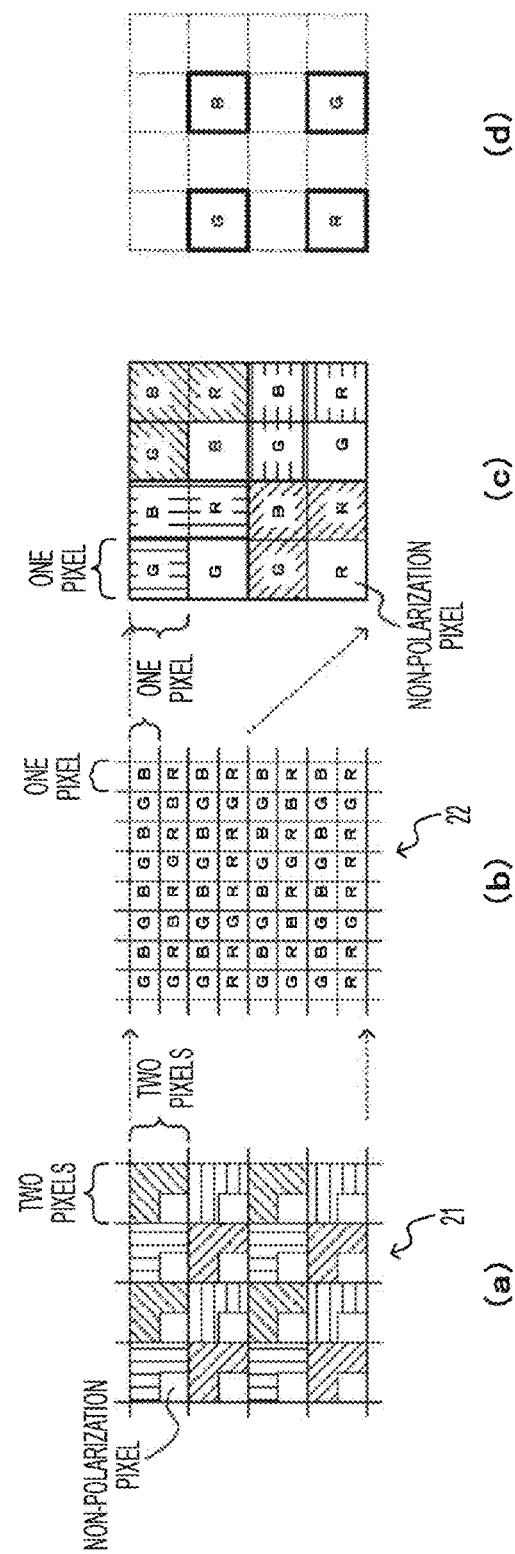
FIG. 23 is a diagram exemplifying another configuration of the imaging unit.

In FIG. 23, in the polarizer 21 of the imaging unit, one non-polarization pixel is provided in the identical polarization pixel block in units of 2×2 pixels, as in (A) of FIG. 23. In addition, in the polarizer 21, a polarization pattern unit block of 4×4 pixels made up of four identical polarization pixel blocks whose polarization directions are different from each other is repeatedly provided in the row direction and the column direction of pixels.

Meanwhile, in the color filter 22, three polarization pixels within the identical polarization pixel block are set as a red pixel R, a green pixel G, and a blue pixel B, as illustrated in (B) of FIG. 23. Furthermore, for the one non-polarization pixel within the identical polarization pixel block, the color of the pixel is set such that the color array when the non-polarization pixel is selected from each identical polarization pixel block becomes a desired color array, for example, the Bayer array illustrated in (C) of FIG. 23.

In the case of configuring the imaging unit in this manner, as illustrated in (D) of FIG. 23, the non-polarized image generating unit selects the non-polarization pixel from each identical polarization pixel block, thereby being able to easily generate a non-polarized image in which the size in the horizontal and vertical directions is made substantially (½) times and the color array is the Bayer array. In addition, since the polarization pixels are not used, a non-polarized image can be generated without being affected by polarized light.

Figure 24:
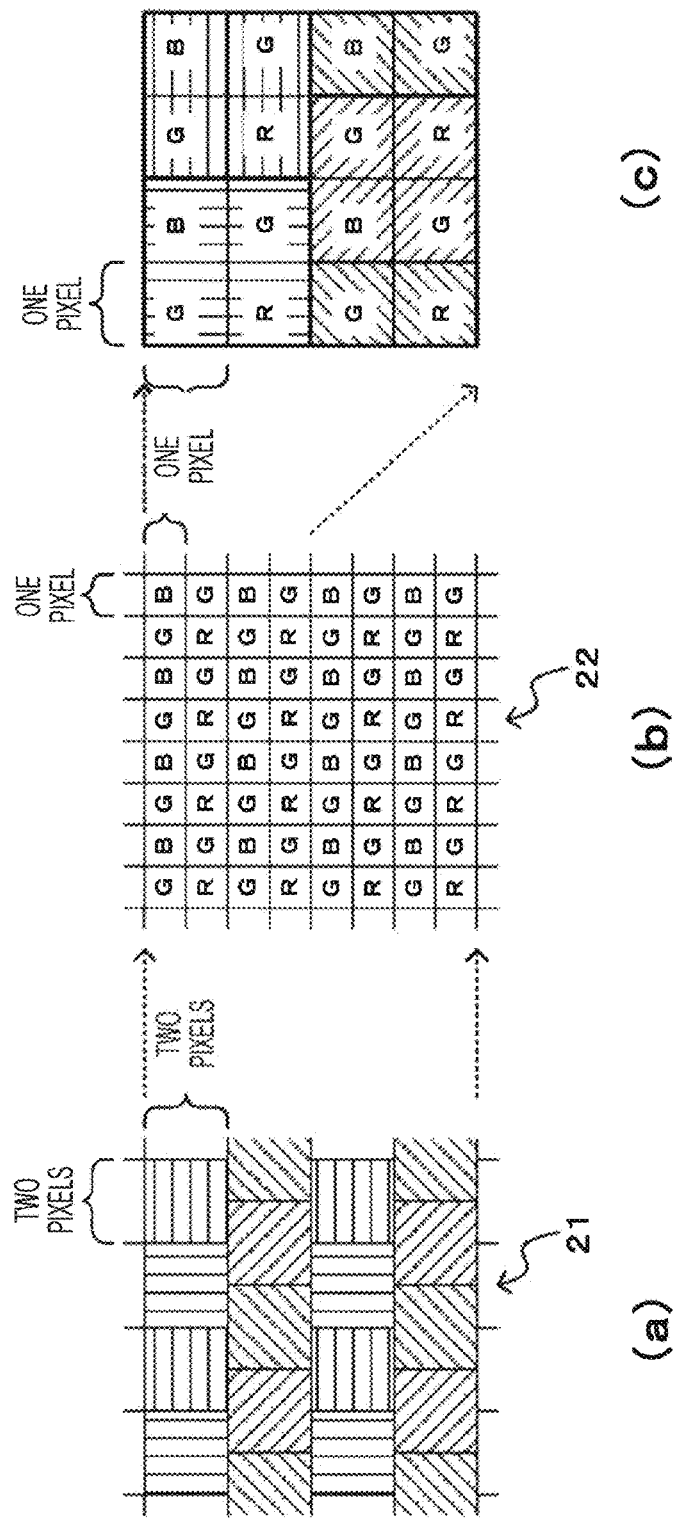
FIG. 24 is a diagram exemplifying another configuration of the imaging unit.

In FIG. 24, in the polarizer 21 of the imaging unit, the identical polarization pixel blocks having different polarization directions are repeatedly provided in the row direction of pixels in a predetermined order. Additionally, in a subsequent row, a difference in block position with respect to a preceding row is generated in the row direction and the identical polarization pixel blocks having polarization directions different from those of the preceding row is repeatedly provided in the row direction in a predetermined order. For example, as illustrated in (A) of FIG. 24, the polarizer 21 sets a 2×2 pixel unit having an equal polarization direction as the identical polarization pixel block. Furthermore, the polarizer 21 is configured such that the polarization directions of the identical polarization pixel blocks adjacent in the horizontal direction have a difference of 90 degrees. In addition, the polarizer 21 is configured such that, in regard to the identical polarization pixel blocks arranged in the horizontal direction, an identical polarization pixel block group in the subsequent row, that is, the identical polarization pixel blocks adjacent on the lower side in the vertical direction have polarization directions different from those of the identical polarization pixel blocks in the preceding row and have a difference of 90 degrees in the polarization direction with respect to the identical polarization pixel blocks adjacent in the horizontal direction. Besides, the polarizer 21 is configured such that the identical polarization pixel block group in the subsequent row generates a difference in block position by one pixel in the horizontal direction with respect to the identical polarization pixel block group in the preceding row.

Meanwhile, as illustrated in (B) of FIG. 24, the color filter 22 sets a 2×2 pixel block made up of one red pixel R, one blue pixel B, and two green pixels G as the color pattern unit block. Additionally, the color filter 22 is configured as a Bayer array in which this color pattern unit block is repeatedly provided in the row direction and the column direction of pixels.

Furthermore, as illustrated in (C) of FIG. 24, the polarizer and the color filter are configured such that the positions of the identical polarization pixel block and the color pattern unit block coincide.

In the case of configuring the imaging unit in this manner, as in the case of (D) of FIG. 22, the non-polarized image generating unit calculates, for each color, an average value of two pixel values having a difference of 90 degrees in the polarization direction and most proximate to each other in the horizontal direction, to set as a pixel value of the non-polarized image. Therefore, in regard to the number of pixels of the non-polarized image, the number of pixels in the horizontal and vertical directions is not made substantially (½) times unlike the case illustrated in (B) of FIG. 10. Besides, since the average value of two pixel values for each color is used as a non-polarization pixel value, a non-polarized image whose color array is the Bayer array can be easily generated.

Note that, although FIG. 24 exemplify a case where the identical polarization pixel blocks having a difference of 90 degrees in the polarization direction are provided side by side in the row direction (horizontal direction), the identical polarization pixel blocks may be provided side by side in the column direction (vertical direction) such that the identical polarization pixel block group in a subsequent column is placed at a position shifted by one pixel in the vertical direction. In this case, the non-polarized image generating unit calculates, for each color, an average value of two pixel values having a difference of 90 degrees in the polarization direction and most proximate to each other in the vertical direction, to set as a pixel value of the non-polarized image.

Furthermore, since the block position of the identical polarization pixel block in the subsequent row (column) is shifted by one pixel in the horizontal direction (vertical direction), the spatial resolution of the normal line information can be increased, as compared with the configuration of FIG. 22.

Figure 25:
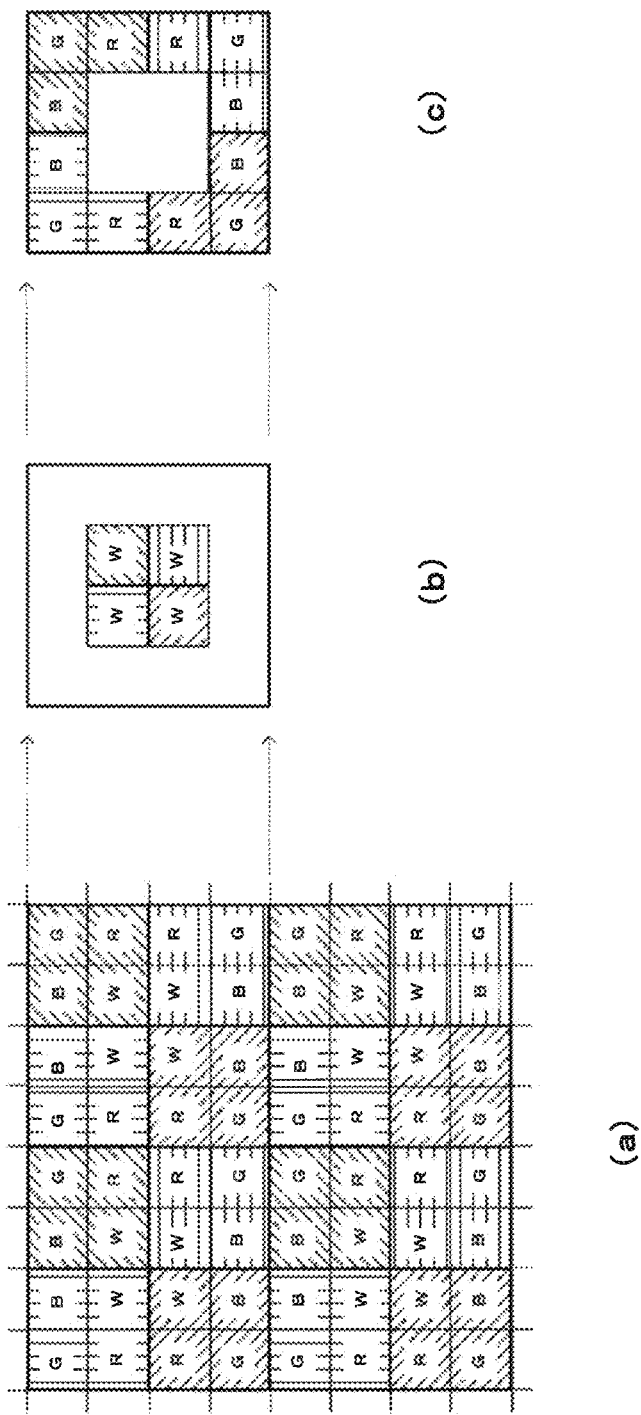
FIG. 25 is a diagram for explaining a configuration and an action in a case where white pixels are provided.

Additionally, FIGS. 2 and 21 to 24 have exemplified a case where the identical polarization pixel block is constituted by the red pixel, the green pixel, and the blue pixel but a configuration in which a white pixel is provided in the identical polarization pixel block may be adopted. FIG. 25 is a diagram for explaining a configuration and an action in a case where white pixels are provided. (A) of FIG. 25 exemplifies a case where white pixels (W) are provided in the imaging unit 20 illustrated in FIG. 2. In the imaging unit 20, sensitivity is likely to be lowered because a polarizer is provided. Therefore, in a dark image portion equal to or lower than a luminance level set in advance, ellipsometry is performed using white pixels as illustrated in (B) of FIG. 25. Meanwhile, in an image portion brighter than the set luminance level, ellipsometry is performed using the red pixel, the green pixel, and the blue pixel as illustrated in (C) of FIG. 25 to generate the normal line information. In addition, since the specular reflection component is small in the dark image portion, the normal line information is generated as an image of only the diffuse reflection component. In this manner, a dynamic range in generating the normal line information can be enlarged, as compared with a case where no white pixel is provided.

Additionally, in the case of calculating the chrominance during the specular reflection component removal processing, if W=R+G+B is assumed, formula (8) can be replaced with formula (23). Furthermore, since an S/N ratio of the white pixel is good, the white pixel is hardly affected by noise during the chrominance calculation.

[Mathematical Formula 10]

$$I'_{vpol} = \sqrt{W^2_{vpol} - (4R_{vpol}G_{vpol} + G_{vpol}B_{vpol} + 4B_{vpol}R_{vpol})} \quad (23)$$

FIG. 26 exemplifies a case where the white pixels are provided in the another configurations of the imaging unit. (A) of FIG. 26 illustrates a case where the white pixels are provided in the imaging unit having the configuration illustrated in FIG. 21. (B) of FIG. 26 illustrates a case where the white pixels are provided in the imaging unit having the configuration illustrated in FIG. 22. (C) of FIG. 26 illustrates a case where the white pixels are provided in the imaging unit having the configuration illustrated in FIG. 24.

Even with such other configurations of the imaging unit, since it is possible to simultaneously generate a polarized image with a plurality of polarization directions, it is possible to prevent degradation of temporal resolution of the polarized image. In addition, since the imaging unit is configured in such a manner that a plurality of pixels having an identical polarization direction is set as the identical polarization pixel block and pixels of respective colors are included in the identical polarization pixel block, the polarized image can be generated with polarized light with a high extinction ratio. Furthermore, by using the polarized image generated using polarized light with a high extinction ratio, the normal line information can be generated with high accuracy. Note that the color array of the imaging unit is not limited to the Bayer array and other color arrays may be used.

Additionally, in the above-described embodiments, the size of the identical polarization pixel block has been set to 2×2 pixels. However, if the pixel size decreases due to an improvement of the imaging unit to high resolution, there is a risk where a sufficient extinction ratio cannot be obtained even with a size of 2×2 pixels. In such a case, for example, if the identical polarization pixel block is enlarged to 4×4 pixels, a polarized image with a sufficient extinction ratio can be acquired. Also in this case, the non-polarized image can be easily generated by performing, for example, processing of calculating an average value of two close pixels of an identical color having polarization directions orthogonal to each other, calculating an average value of four close pixels of an identical color having the polarization directions orthogonal to each other, or calculating a pixel value from the average value calculated for pixels between pixel positions for which the average value has been calculated.

Note that the processing indicated in the above-described flowcharts is not limited to sequential processing in which the processing is performed in the order of steps but may be performed by pipeline processing or parallel processing. In addition, the color filter is not limited to the primary color system as described above but a color filter of a complementary color system may be used.

5. Application Example

Next, an application example of the image processing apparatus (image processing method) will be described.

Figure 27:
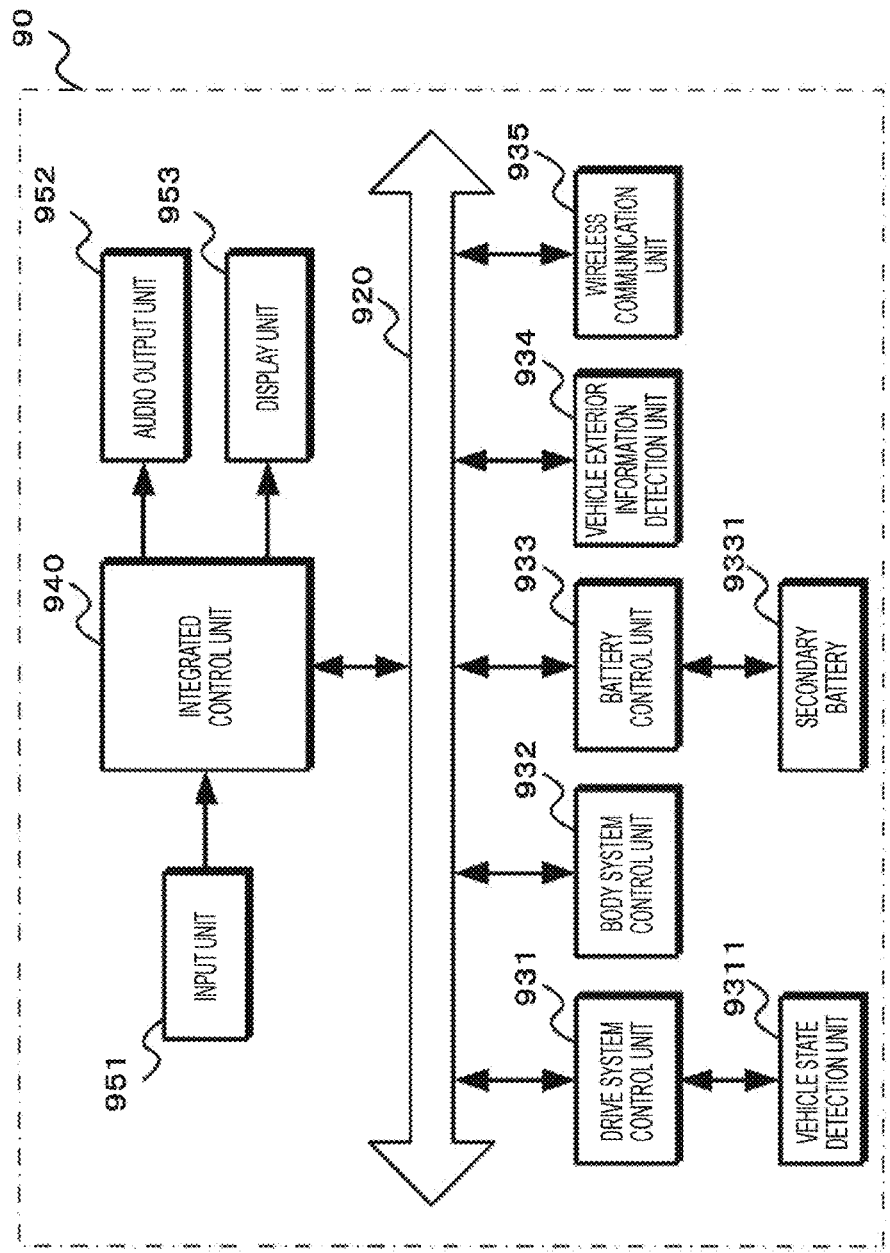
FIG. 27 is a block diagram exemplifying a schematic configuration of a vehicle control system.

FIG. 27 is a block diagram exemplifying a schematic configuration of a vehicle control system using the image processing apparatus of this technology. The vehicle control system 90 includes a plurality of control units and detecting units connected via a communication network 920. In the example illustrated in FIG. 27, the vehicle control system 90 includes a drive system control unit 931, a body system control unit 932, a battery control unit 933, a vehicle exterior information detecting unit 934, a wireless communication unit 935, and an integrated control unit 940. The communication network 920 can be an in-vehicle communication network conforming to an arbitrary standard such as a controller area network (CAN), a local interconnect network (LIN), a local area network (LAN), and FlexRay (registered trademark). In addition, an input unit 951, an audio output unit 952, and a display unit 953 are connected to the integrated control unit 940.

Each control unit includes a microcomputer that performs computational processing according to various programs, a storage unit that stores programs executed by the microcomputer or parameters used for various computational tasks and so on, and a drive circuit that drives various apparatuses to be controlled.

The drive system control unit 931 controls the action of an apparatus related to a drive system of a vehicle according to various programs. For example, the drive system control unit 931 functions as a driving force generating apparatus for generating a driving force of the vehicle such as an internal combustion engine or a driving motor, a driving force transmitting mechanism for transmitting a driving force to wheels, and a steering mechanism that regulates a steer angle of the vehicle. In addition, the drive system control unit 931 may have a function as a control apparatus such as a braking apparatus that generates a braking force of the vehicle, or a function as a control apparatus such as an antilock brake system (ABS) or an electronic stability control (ESC).

A vehicle state detecting unit 9311 is connected to the drive system control unit 931. For example, the vehicle state detecting unit 9311 includes a gyro sensor that detects an angular velocity of the axial rotational motion of a vehicle body, an acceleration sensor that detects the acceleration of the vehicle, or at least one of sensors for detecting an operation amount of an accelerator pedal, an operation amount of a brake pedal, a steering angle of a steering wheel, engine speed, running speed, and the like. The drive system control unit 931 performs computational processing using a signal input from the vehicle state detecting unit 9311 and controls the internal combustion engine, the driving motor, an electric power steering apparatus, a brake apparatus, or the like.

The body system control unit 932 controls the actions of various apparatuses equipped on the vehicle body according to various programs. For example, the body system control unit 932 functions as a keyless entry system, a smart key system, a power window apparatus, or a control apparatus for various lamps such as a headlamp, a back lamp, a brake lamp, a turn signal lamp, a fog lamp, or the like. In this case, the body system control unit 932 can receive input of a radio wave transmitted from a portable device that substitutes a key or signals from various switches. The body system control unit 932 accepts input of the above-mentioned radio wave or signals and controls a door lock apparatus, the power window apparatus, the lamp, and the like of the vehicle.

The battery control unit 933 controls a secondary battery 9331 which is a power supply source of the driving motor according to various programs. For example, information such as a battery temperature, a battery output voltage, a remaining capacity of the battery, or the like is input to the battery control unit 933 from a battery apparatus including the secondary battery 9331. The battery control unit 933 performs computational processing using these signals and controls temperature regulation for the secondary battery 9331 or a cooling apparatus or the like included in the battery apparatus.

The vehicle exterior information detecting unit 934 detects information outside the vehicle mounted with the vehicle control system 90. In the vehicle exterior information detecting unit 934, the imaging system using the image processing apparatus of this technology is used.

Figure 28:
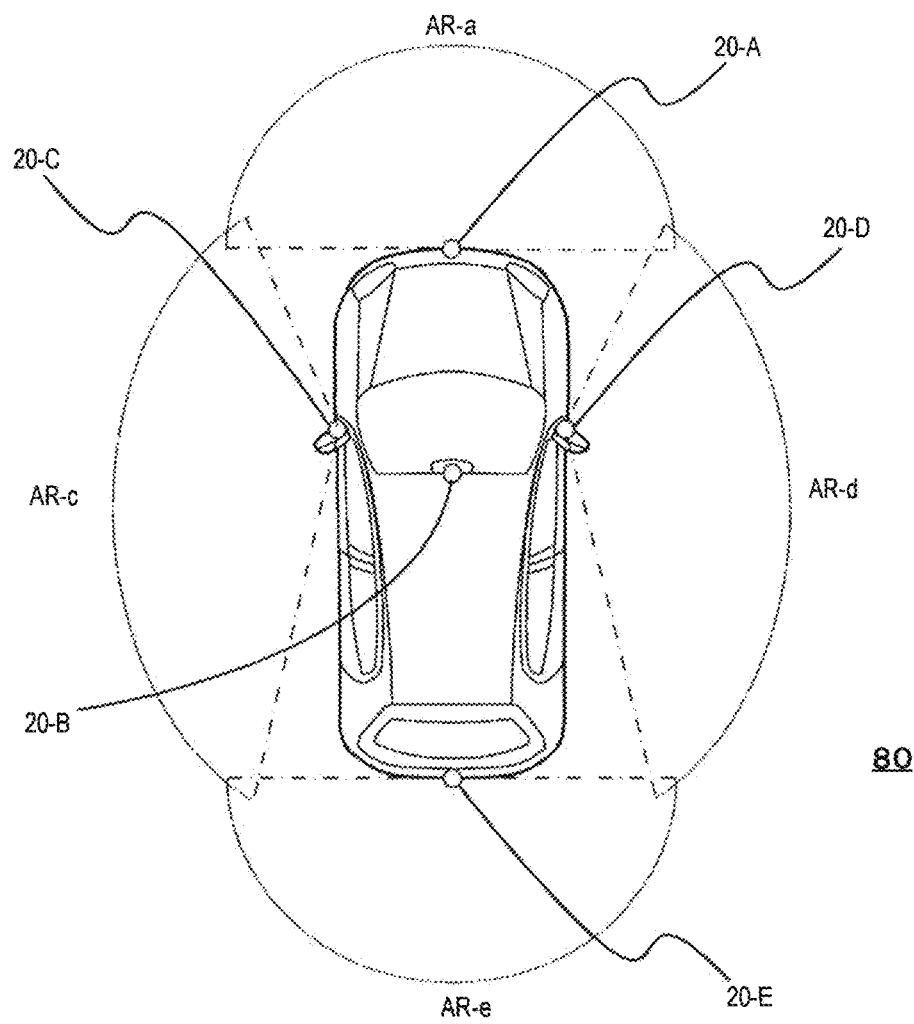
FIG. 28 is a diagram illustrating an installation example of the imaging units.

FIG. 28 is a diagram illustrating an installation example of the imaging units. For example, the imaging unit 20 of the imaging system is provided at at least one position of a front nose, a side mirror, a rear bumper, a back door, and an upper portion of a windshield in a passenger compartment of a vehicle 80. An imaging unit 20-A provided at the front nose and an imaging unit 20-B provided at the upper portion of the windshield in the passenger compartment mainly acquire an image ahead of the vehicle 80. Imaging units 20-C and 20-D provided at the side mirrors mainly acquire images of the sides of the vehicle 80. An imaging unit 20-E provided at the rear bumper or the back door mainly acquires an image behind the vehicle 80. Note that FIG. 28 illustrates an example of respective photographing ranges of the imaging units 20-A to 20-E. An imaging range AR-a indicates an imaging range of the imaging unit 20-A provided at the front nose, imaging ranges AR-c and AR-d indicate imaging ranges of the imaging units 20-C and 20-D provided at the side mirrors, respectively, and an imaging range AR-e indicates an imaging range of the imaging unit 20-E provided at the rear bumper or the back door.

Returning to FIG. 27, the vehicle exterior information detecting unit 934 images a peripheral region of the vehicle and acquires a polarized image. In addition, the vehicle exterior information detecting unit 934 separates or extracts the reflection component from the acquired polarized image and, for example, generates information that can be used for vehicle control and the like, such as an image from which the reflection component has been separated and removed.

The wireless communication unit 935 communicates with the outside of the vehicle, for example, other vehicles and a management center that manages road conditions via a wireless communication network such as Dedicated Short Range Communication (DSRC) (registered trademark), and outputs the received information to the integrated control unit 940. In addition, the wireless communication unit 935 may transmit the information acquired by the vehicle exterior information detecting unit 934 to other vehicles, the management center, and so on. Note that the wireless communication unit 935 may communicate with the management center via a wireless communication network such as a wireless communication network of a wireless LAN, a wireless communication network for mobile phones such as 3G, LTE, 4G, and the like. Furthermore, the wireless communication unit 935 may receive signals from the global navigation satellite system (GNSS) or the like to perform positioning and output a positioning result to the integrated control unit 940.

The input unit 951, the audio output unit 952, and the display unit 953 are connected to the integrated control unit 940. The input unit 951 is realized by an apparatus that can be operated by an occupant to input, such as a touch panel, a button, a microphone, a switch, or a lever. The input unit 951 generates an input signal on the basis of information input by the occupant or the like to output to the integrated control unit 940.

The audio output unit 952 audibly notifies the occupant of the vehicle of the information by outputting audio based on an audio signal from the integrated control unit 940. The display unit 953 displays an image on the basis of an image signal from the integrated control unit 940 and visually notifies the occupant of the vehicle of the information.

The integrated control unit 940 has a central processing unit (CPU), a read only memory (ROM), a random access memory (RAM), and so on. The read only memory (ROM) stores various programs to be executed by the central processing unit (CPU). The random access memory (RAM) stores information such as various parameters, computation results, or sensor values. The CPU executes the various programs stored in the ROM and controls the overall actions within the vehicle control system 90 in accordance with the input signal from the input unit 951, the information acquired by communicating with the respective control units, the vehicle exterior information detecting unit, and the wireless communication unit via the communication network 920, the information stored in the RAM, and so on. Meanwhile, the integrated control unit 940 generates an audio signal indicating information to be audibly notified to the occupant of the vehicle to output to the audio output unit 952 and generates an image signal that visually notifies the occupant of information to output to the display unit 953. The integrated control unit 940 also communicates with various devices existing outside the vehicle, such as other vehicles and the management center, using the wireless communication unit 935. In addition, the integrated control unit 940 performs vehicle driving support on the basis of map information stored in the ROM or the RAM and the positioning result acquired from the wireless communication unit 935.

Note that, in the example illustrated in FIG. 27, at least two control units connected via the communication network 920 may be integrated as one control unit. Alternatively, each control unit may be constituted by a plurality of control units. Furthermore, the vehicle control system 90 may include another control unit not illustrated. Additionally, in the above description, some or all of the functions assigned to one of the control units may be provided in another control unit. In other words, as long as information is transmitted and received via the communication network 920, predetermined computational processing may be performed by one of the control units.

In such a vehicle control system, in a case where the image processing apparatus according to the present technology is applied to, for example, the vehicle exterior information detecting unit, the vehicle exterior information detecting unit recognizes an object on the basis of, for example, an image of a peripheral region from which the reflection component is separated and removed, thereby being able to easily recognize the object which is difficult to recognize by reflected light. Therefore, by using the image processing apparatus (image processing method) of the present technology, it is possible to construct a vehicle control system enabling safe driving. Furthermore, since it is easy to recognize an object which is difficult to recognize by reflected light, it can be applied to a monitoring system and the like.

In addition, the series of processing procedures described in the description can be executed by hardware, software, or a complex configuration of both. In the case of executing the processing by software, a program recording a processing sequence is installed on a memory within a computer incorporated in dedicated hardware and executed. Alternatively, it is possible to install and execute a program for executing the above-described processing on a general-purpose computer capable of executing various processing procedures.

For example, the program can be recorded in advance on a hard disk as a recording medium, a solid state drive (SSD), or a read only memory (ROM). Alternatively, the program can be temporarily or permanently saved and kept (recorded) on a removable recording medium such as a flexible disk, a compact disc read only memory (CD-ROM), a magneto optical (MO) disk, a digital versatile disc (DVD), a Blu-Ray Disc (BD) (registered trademark), a magnetic disk, or a semiconductor memory card. Such a removable recording medium can be provided as so-called package software.

Furthermore, in addition to installing the program from a removable recording medium on a computer, the program may be wirelessly or wiredly transferred from a download site to a computer via a network such as a local area network (LAN) or the Internet. In the computer, it is possible to receive the program transferred in such a manner and to install the program on a recording medium such as a built-in hard disk.

Note that the effects described in the present specification merely serve as examples and not construed to be limited. There may be an additional effect not described herein as well. Furthermore, the present technology should not be construed as being limited to the above-described embodiments. These embodiments disclose the present technology in the form of exemplification and it is self-evident that those skilled in the art can make modifications and substitutions of the embodiments without departing from the gist of the present technology. That is, in order to judge the gist of the present technology, claims should be considered.

Furthermore, the image processing apparatus of the present technology can have the following configuration.

(1) An image processing apparatus including a polarized image processing unit that separates or extracts a reflection component using a polarized image generated by an image pickup element having a configuration in which an identical polarization pixel block made up of a plurality of pixels with an identical polarization direction is provided for each of a plurality of polarization directions and pixels of respective predetermined colors are provided in the identical polarization pixel block.

(2) The image processing apparatus according to (1), in which the polarized image processing unit extracts a diffuse reflection component using the polarized image.

(3) The image processing apparatus according to (1), in which the polarized image processing unit separates a diffuse reflection component and a specular reflection component using the polarized image.

(4) The image processing apparatus according to (1), further including a normal line information generating unit that generates normal line information from the polarized image from which the reflection component has been separated or extracted by the polarized image processing unit.

(5) The image processing apparatus according to (4), in which the polarized image processing unit extracts a diffuse reflection component using the polarized image, and the normal line information generating unit generates the normal line information from a polarized image indicating the diffuse reflection component extracted by the polarized image processing unit.

(6) The image processing apparatus according to (4), in which the polarized image processing unit separates a diffuse reflection component and a specular reflection component using the polarized image, and the normal line information generating unit integrates the normal line information generated from a polarized image indicating the diffuse reflection component separated by the polarized image processing unit and the normal line information generated from a polarized image indicating the specular reflection component separated by the polarized image processing unit.

(7) The image processing apparatus according to (6), in which the normal line information generating unit weights the polarized image indicating the diffuse reflection component and the polarized image indicating the specular reflection component and integrates the normal line information.

(8) The image processing apparatus according to (7), in which the normal line information generating unit performs weighting according to which of diffuse reflection and specular reflection is dominant and integrates the normal line information.

(9) The image processing apparatus according to (8), in which the normal line information generating unit sets a reflection component having a larger luminance change caused by a difference in polarization angle as the dominant reflection component.

(10) The image processing apparatus according to (8), in which the normal line information generating unit sets a reflection component having less error with respect to a predetermined luminance change caused by a difference in polarization angle as the dominant reflection component.

(11) The image processing apparatus according to any one of (1) to (10), further including a correction processing unit that adjusts a gain of the polarized image for each of the predetermined colors, in which the polarized image processing unit separates or extracts the reflection component from the polarized image for which a gain has been adjusted by the correction processing unit.

(12) The image processing apparatus according to any one of (1) to (11), further including a non-polarized image generating unit that generates a non-polarized image for each color from the polarized image using pixels whose polarization directions are orthogonal to each other.

INDUSTRIAL APPLICABILITY

According to an image processing apparatus, an image processing method, and an image pickup element of this technology, processing of separating or extracting a reflection component is performed on a polarized image generated by an image pickup element having a configuration in which an identical polarization pixel block made up of a plurality of pixels with an identical polarization direction is provided for each of a plurality of polarization directions and pixels of respective predetermined colors are provided in the identical polarization pixel block. Consequently, for example, highly accurate normal line information can be generated by taking the reflection component into account. Therefore, it is suitable for a device for acquiring a three-dimensional shape of an object, or the like.

REFERENCE SIGNS LIST

10 Imaging system
20 Imaging unit
21 Polarizer
22 Color filter
30 Image processing unit
31 Correction processing unit
32 Polarized image processing unit
33 Specular reflection removing unit
34 Reflection component separating unit
35 Normal line information generating unit
36 Specular reflection normal line information generating unit
37 Diffuse reflection normal line information generating unit
38 Normal line information integrating unit
39 Non-polarized image generating unit
80 Vehicle
90 Vehicle control system

The invention claimed is:

1. An image processing apparatus comprising:
a polarized image processing unit configured to separate or extract a plurality of reflection components using a polarized image generated by an image pickup element having a configuration in which an identical polarization pixel block made up of a plurality of pixels with an identical polarization direction is provided for each of a plurality of polarization directions and pixels of respective predetermined colors are provided in the identical polarization pixel block; and
a normal line information generating unit configured to generate normal line information from at least one polarized image from which at least one reflection component of the plurality of reflection components has been separated or extracted by the polarized image processing unit,
wherein the polarized image processing unit separates a diffuse reflection component and a specular reflection component using the polarized image generated by the image pickup element,
wherein the normal line information generating unit weights the polarized image indicating the diffuse reflection component and the polarized image indicating the specular reflection component and integrates the normal line information, and
wherein the polarized image processing unit and the normal line information generating unit are each implemented via at least one processor.

2. The image processing apparatus according to claim 1, wherein
the polarized image processing unit extracts the diffuse reflection component using the polarized image.

3. The image processing apparatus according to claim 1, wherein
the polarized image processing unit extracts the diffuse reflection component using the polarized image, and
the normal line information generating unit generates the normal line information from the polarized image indicating the diffuse reflection component extracted by the polarized image processing unit.

4. The image processing apparatus according to claim 1, wherein
the normal line information generating unit integrates the normal line information generated from the polarized image indicating the diffuse reflection component separated by the polarized image processing unit and the normal line information generated from the polarized image indicating the specular reflection component separated by the polarized image processing unit.

5. The image processing apparatus according to claim 4, wherein the normal line information generating unit performs weighting according to which of diffuse reflection and specular reflection is dominant and integrates the normal line information.

6. The image processing apparatus according to claim 5, wherein
the normal line information generating unit sets a reflection component having a larger luminance change caused by a difference in polarization angle as the dominant reflection component.

7. The image processing apparatus according to claim 5, wherein
the normal line information generating unit sets a reflection component having less error with respect to a predetermined luminance change caused by a difference in polarization angle as the dominant reflection component.

8. The image processing apparatus according to claim 1, further comprising:
a correction processing unit that adjusts a gain of the polarized image generated by the image pickup element for each of the predetermined colors,
wherein the polarized image processing unit separates or extracts the at least one reflection component from the polarized image for which the gain has been adjusted by the correction processing unit, and
wherein the correction processing unit is implemented via at least one processor.

9. The image processing apparatus according to claim 1, further comprising:
a non-polarized image generating unit that generates a non-polarized image for each color from the polarized image generated by the image pickup element using pixels whose polarization directions are orthogonal to each other,
wherein the non-polarized image generating unit is implemented via at least one processor.

10. An image processing method comprising:
providing an identical polarization pixel block made up of a plurality of pixels with an identical polarization direction for each of a plurality of polarization directions;
separating or extracting a plurality of reflection components in a polarized image processing unit using a polarized image for each predetermined color generated by an image pickup element having a configuration in which pixels for respective colors are provided in the identical polarization pixel block; and
generating normal line information from at least one polarized image from which at least one reflection component of the plurality of reflection components has been separated or extracted,
wherein the polarized image processing unit separates a diffuse reflection component and a specular reflection component using the polarized image generated by the image pickup element, and
wherein the polarized image indicating the diffused reflection component and the polarized image indicating the specular reflection component are weighted and integrated in order to generate the normal line information.

11. An image pickup element comprising:
a polarizer in which an identical polarization pixel block made up of a plurality of pixels with an identical polarization direction is provided for each of a plurality of polarization directions;

a color filter in which pixels of respective predetermined colors are provided in the identical polarization pixel block of the polarizer; and
a sensor that generates an image signal on the basis of object light having passed through the polarizer and the color filter,
wherein the color filter is configured in such a manner that a color pattern unit block serving as a unit of a predetermined color array is repeatedly provided in a row direction and a column direction of pixels, and
wherein the identical polarization pixel block of the polarizer has a size equal to the color pattern unit block.

12. The image pickup element according to claim 11, wherein
the color filter is configured in such a manner that a color pattern unit block serving as a pixel block of a predetermined color array is repeatedly provided in a row direction and a column direction of pixels,
the polarizer is configured in such a manner that a polarization pattern unit block serving as a pixel block in which the identical polarization pixel blocks are provided for the plurality of respective polarization directions is repeatedly provided in the row direction and the column direction of pixels, and
a position difference between the color pattern unit block and the polarization pattern unit block is generated such that pixels of respective predetermined colors are provided in the identical polarization pixel block.

13. The image pickup element according to claim 11, wherein
the polarizer alternately includes the identical polarization pixel blocks whose polarization directions are orthogonal to each other in the row direction or the column direction of pixels.

14. The image pickup element according to claim 11, wherein
the polarizer is configured in such a manner that the identical polarization pixel blocks having different polarization directions are repeatedly provided in a predetermined order in the row direction (or the column direction) of pixels, and in a subsequent row (or a subsequent column), a difference in block position is generated with respect to a preceding row (or a preceding column) in the row direction (or the column direction) and the identical polarization pixel blocks having polarization directions different from the polarization directions of the preceding row (or the preceding column) are repeatedly provided in the row direction (or the column direction) in a predetermined order.

15. The image pickup element according to claim 11, wherein
the polarizer has a non-polarization pixel provided in the identical polarization pixel block, and
the color filter sets a color for the non-polarization pixel such that a color array when the non-polarization pixel is selected becomes a desired array.

16. The image pickup element according to claim 11, wherein
the color filter has pixels of three primary colors and a white pixel provided in the identical polarization pixel block.

* * * * *